(12) United States Patent
Kaneda et al.

(10) Patent No.: US 6,864,921 B2
(45) Date of Patent: Mar. 8, 2005

(54) DISPLAY CONTROL SYSTEM FOR CONTROLLING A DISPLAY SCREEN FORMED OF MULTIPLE DISPLAY UNITS

(75) Inventors: Hiroshi Kaneda, Tokyo (JP);
Yoshimitsu Tanaka, Kanagawa (JP);
Ikuo Matsumura, Tokyo (JP);
Masataka Tada, Tokyo (JP)

(73) Assignee: Sony Corporation, Tokyo (JP)

( * ) Notice: Subject to any disclaimer, the term of this patent is extended or adjusted under 35 U.S.C. 154(b) by 467 days.

(21) Appl. No.: 09/977,830

(22) Filed: Oct. 15, 2001

(65) Prior Publication Data
US 2002/0071057 A1 Jun. 13, 2002

(30) Foreign Application Priority Data
Oct. 17, 2000 (JP) .................................... P2000-317043

(51) Int. Cl.[7] ................................................. H04N 5/66
(52) U.S. Cl. ......................... 348/383; 348/588; 345/1.3
(58) Field of Search ................................ 348/383, 588, 348/189, 190, 705, 706, 554; 345/1.1, 1.3

(56) References Cited

U.S. PATENT DOCUMENTS

| | | | | |
|---|---|---|---|---|
| 5,396,257 A | * | 3/1995 | Someya et al. ............. | 345/1.1 |
| 5,923,307 A | * | 7/1999 | Hogle, IV ...................... | 345/4 |
| 6,219,011 B1 | * | 4/2001 | Aloni et al. .................. | 345/1.3 |
| 6,310,650 B1 | * | 10/2001 | Johnson et al. ............. | 348/383 |
| 6,501,441 B1 | * | 12/2002 | Ludtke et al. ............... | 345/1.1 |
| 6,516,329 B1 | * | 2/2003 | Smith ..................... | 715/501.1 |
| 6,695,451 B1 | * | 2/2004 | Yamasaki et al. ............. | 353/30 |

* cited by examiner

Primary Examiner—Victor R. Kostak
(74) Attorney, Agent, or Firm—Jay H. Maioli

(57) ABSTRACT

A display control system including: a screen unit for forming a screen by a plurality of display units each displaying a part of an image; a video signal processing unit for generating a post-video processing signal to be displayed by the plurality of display units from an input video signal, and then supplying the post-video processing signal to the screen unit; an image area display unit having a display unit for schematically displaying the screen unit based on the display information including position information of the display units forming the screen unit, the image area display unit displaying a state of display of the video signal as an image area on the display unit; and a control unit for controlling the state of display of the image area; wherein based on the result of the control, the control unit generates control information for controlling a state of display of the image displayed on the screen unit, and then the video signal processing unit generates the post-video processing signal based on the control information and supplies the post-video processing signal to the screen unit.

18 Claims, 18 Drawing Sheets

FIG. 9
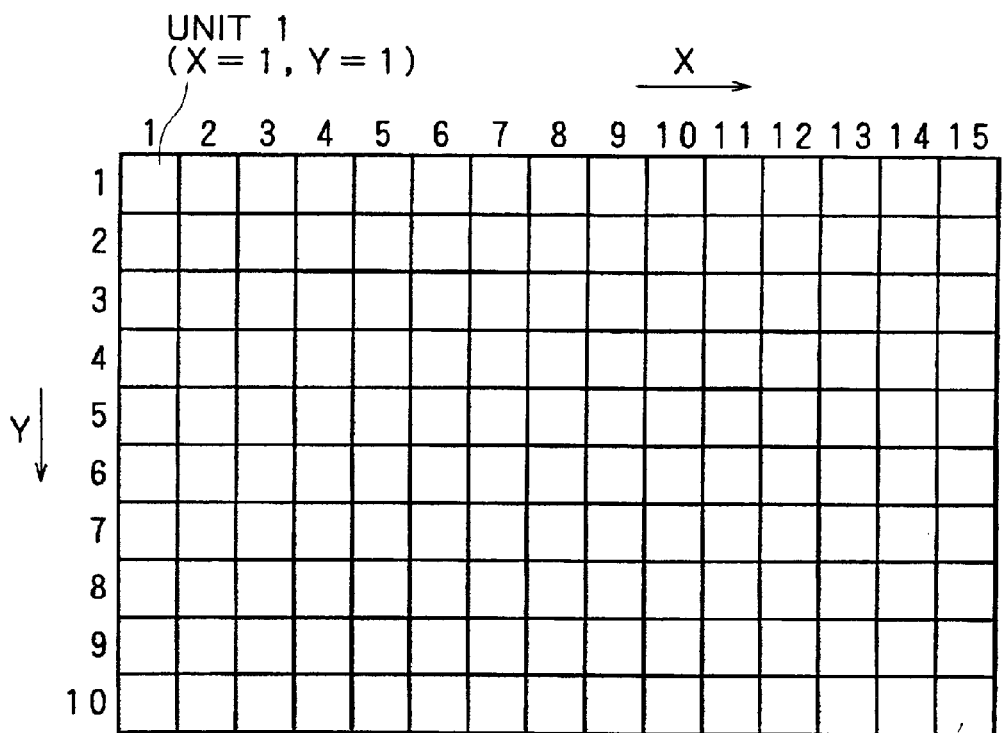
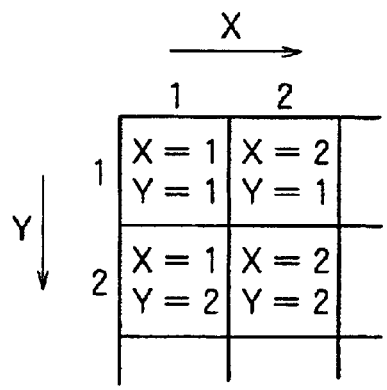

FIG. 16

| SYNC | SID1 | DID1 | Reserved | Reserved | Reserved | Reserved | SID2 | DID2 | CTRL | SIZE |
|------|------|------|----------|----------|----------|----------|------|------|------|------|

| RC | Reserved | Position-X | Position-Y | Size-X | Size-Y | Zoom-X | Zoom-Y | FCS | SYNC |
|----|----------|------------|------------|--------|--------|--------|--------|-----|------|

FIG. 17 SCHEDULER

| Scheduler | | | | | | | |
|---|---|---|---|---|---|---|---|
| ICU No. | | | | | | | |
| | MasterInput | | | | | | |
| | Input-1 | Composite | Composite | Composite | Composite | Composite | Composite |
| | InputSource | | | | | | |
| | Brightness | | | | | | |
| | ZoomHor, | | | | | | |
| | ZoomVer, | | | | | | |

DISPLAY CONTROL SYSTEM FOR CONTROLLING A DISPLAY SCREEN FORMED OF MULTIPLE DISPLAY UNITS

BACKGROUND OF THE INVENTION

The present invention relates to a display control system, a display control apparatus, and a display control method for controlling a display image displayed on a display apparatus.

Recently, a display system has been constructed which displays a video signal reproduced by a video reproducing apparatus on a large screen apparatus formed by a plurality of units installed outdoors.

As shown in FIG. 19, a conventional display system 2 for displaying the video signal for example comprises: a video signal unit 40; a video signal selecting unit 41; a first control unit 42; a supervising monitor unit 43; a video processing unit 44; a screen unit 46; a checking monitor unit 47; a second control unit 48; and a power unit 49.

The conventional display system 2 also includes an audio unit 45 comprising: an audio signal generating unit for generating an audio signal when the video signal selected by the video signal selecting unit 41 includes the audio signal or when the audio signal is added to the video signal selected by the video signal selecting unit 41; an audio signal adjusting unit for adjusting the audio signal; an amplifier unit for amplifying the adjusted audio signal; and an audio signal output unit for outputting the amplified audio signal.

The video signal unit 40 is connected with apparatus such for example as a VCR (Video Cassette Recorder), a DVD (Digital Versatile Disc) (trademark), a video camera, a TV tuner, a satellite broadcasting tuner, and a storage. The video signal unit 40 supplies video signals to the video signal selecting unit 41.

The video signal selecting unit 41 is connected to the first control unit 42. The video signal selecting unit 41 selects an arbitrary video signal from the plurality of video signals supplied from the video signal unit 40. The video signal selecting unit 41 then supplies the selected video signal to the supervising monitor unit 43 and the video processing unit 44.

The video signal selecting unit 41 also supplies the audio signal to the audio unit 45 when the selected video signal includes the audio signal.

The first control unit 42 controls the selection of a video signal by the video signal selecting unit 41. The first control unit 42 also controls a schedule of video signals.

The supervising monitor unit 43 monitors to see whether the video signal selected by the video signal selecting unit 41 is supplied properly.

The audio unit 45 comprises: an audio signal input unit for being supplied with an audio signal; an audio signal processing unit for carrying out signal processing and the like on the audio signal inputted thereto; and an audio signal output unit for outputting the audio signal after the processing.

The video processing unit 44 subjects the video signal supplied from the video signal selecting unit 41 to predetermined video processing to thereby generate a post-processing video signal. Then, the video processing unit 44 supplies the post-processing video signal to the screen unit 46 and the checking monitor unit 47.

The video processing unit 44 is connected to the second control unit 48.

The screen unit 46 displays the video signal supplied from the video processing unit 44 as a display image. The screen unit 46 is formed by a plurality of display units. A display unit of the screen unit 46 further has cells formed by light emitting elements such as light emitting diodes, the cells being arranged in a matrix manner.

The checking monitor unit 47 checks whether the predetermined video processing has been performed on the video signal supplied from the video processing unit 44.

The second control unit 48 controls the video processing unit 44 so as to adjust the size and display position of the display image displayed on the screen unit 46 and thereby obtain a specified display form of the display image. The second control unit 48 comprises a plurality of control buttons and a display panel for displaying a state of operation of the control buttons and the like, as shown in FIG. 20.

The power unit 49 supplies power to the screen unit 46.

With the display system 2, the size, display position and the like of the display image are adjusted while looking at the display image displayed on the screen unit 46. When such adjustment is made, a communication apparatus is used to operate the first control unit 42 and/or the second control unit 48.

Such a display system 2 selects an arbitrary video signal from the plurality of video signals supplied to the video signal selecting unit 41 under control of the first control unit 42, and performs video processing on the selected video signal by means of the video processing unit 44 under control of the second control unit 48 so as to display the video signal on the screen unit 46 in a specified display form.

With the display system 2 described above, when a video disturbance in the display image displayed on the screen unit 46 occurs, for example, the disturbance is considered on the basis of the image displayed on the checking monitor unit 47. When the problem is considered at a place distant from the checking monitor unit 47, it is necessary to record the image showing the above problem on an external medium such as videotape, and then carry the videotape to the place where the consideration is made. Therefore, it takes much time before the consideration is made.

Also, the second control unit 48 for adjusting the size, display position and the like of the display image displayed on the screen unit 46 makes the adjustments on the basis of numerical values. Therefore, it is difficult to grasp the display image after the adjustments to be actually displayed on the screen unit 46, and thus the adjustment of the display image requires much labor.

In addition, since the first control unit 42 and the second control unit 48 are independent of each other, the operation of selecting a video signal by the video signal selecting unit 41 is separate from the operation of making predetermined adjustment of the selected video signal by the video processing unit 44. Therefore, it is difficult to make video adjustment of different video signals.

Moreover, when the size, display position and the like of the display image displayed on the screen unit 46 are adjusted by remote control using a portable terminal or the like, a process from adjusting control by means of a portable terminal to actual completion of the adjusting of the display image displayed on the screen unit 46 requires much time.

Furthermore, with the conventional display system 2, operations from the selection of a specified video signal by the video signal selecting unit 41 to predetermined signal processing for converting the video signal into a signal suitable for the screen unit 46 require many apparatus.

Therefore, installation of the component apparatus requires much space, and more space is required each time a new apparatus is introduced.

Furthermore, the conventional display system 2 has no means to immediately obtain a state of operation of the entire display system. Therefore, when a problem has occurred, solving the problem requires much time.

The present invention has been proposed in view of the above, and it is accordingly an object of the present invention to provide a display control system and a display control apparatus that make it possible to adjust the display image displayed on the screen unit formed by a plurality of display units and to readily make video adjustment of different video signals by controlling a schedule of video signal selection and adjustment.

SUMMARY OF THE INVENTION

In order to solve the above problems, according to the present invention, there is provided a display control system comprising: screen means for forming one screen by a plurality of display units each displaying a part of an image; video signal processing means for generating a post-video processing signal to be displayed by the plurality of display units, from an input video signal, and then supplying the post-video processing signal to the screen means; display means for schematically displaying the screen means as a display area on the basis of display information including position information of the display units forming the screen means, and displaying a state of display of the video signal with respect to the display area as an image area; and control means for controlling the state of display of the image area; wherein on the basis of a result of the control, the control means generates control information for controlling a state of display of the image displayed on the screen means, and then the video signal processing means generates the post-video processing signal on the basis of the control information and supplies the post-video processing signal to the screen means.

Such a display control system controls the display area of the display image displayed on the display means by the control means, supplies the control information generated from a result of the control to the video signal processing means, performs video processing by the video signal processing means on the basis of the control information, and then supplies the post-video processing signal to the screen means.

In order to solve the above problems, according to the present invention, there is provided a display control apparatus for supplying screen means for forming one screen by a plurality of display units each displaying a part of an image with a post-video processing signal to be displayed by the plurality of display units, in which signal is generated from an input video signal, and thereby controlling the display image of the screen means, the display control apparatus comprising: display means for schematically displaying the screen means as a display area on the basis of display information including position information of the display units forming the screen means, and displaying a state of display of the video signal with respect to the display area as an image area; and control means for controlling the state of display of the image area; wherein on the basis of a result of the control, the control means generates control information for controlling a state of display of the image displayed on the screen means, then generates the post-video processing signal on the basis of the control information, and supplies the post-video processing signal to the screen means.

Such a display control apparatus controls the display area of the display image displayed on the display means by the control means, generates the control information from a result of the control, performs video processing on the basis of the control information, and then supplies the post-video processing signal to the screen means.

In order to solve the above problems, according to the present invention, there is provided a display control method for supplying screen means for forming one screen by a plurality of display units each displaying a part of an image with a post-video processing signal to be displayed by the plurality of display units, in which signal is generated from an input video signal, and thereby controlling the display image of the screen means, the display control method comprising: schematically displaying the screen means as a display area on the basis of display information including position information of the display units forming the screen means, and displaying a state of display of the video signal as an image area; controlling the state of display of the displayed image area; and on the basis of a result of the control, generating control information for controlling a state of display of the image displayed on the screen means, generating the post-video processing signal on the basis of the control information, and then supplying the post-video processing signal to the screen means.

Such a display control method controls the display area of the display image, and on the basis of the control information generated from a result of the control, controls the display image displayed on the screen means.

BRIEF DESCRIPTION OF THE DRAWINGS

FIG. 9 illustrates the setting of display unit information of the display units forming the screen unit in which information is supplied to a control and monitoring unit to which the present invention is applied;

FIG. 16 shows a command transmitted from the control and monitoring unit to the video processing unit provided in the display control system to which the present invention is applied;

FIG. 17 is a diagram of assistance in explaining schedule control by the control and monitoring unit provided in the display control system to which the present invention is applied;

DETAILED DESCRIPTION OF THE PREFERRED EMBODIMENTS

Preferred embodiments of the present invention will hereinafter be described in detail with reference to the drawings.

Figure 1:
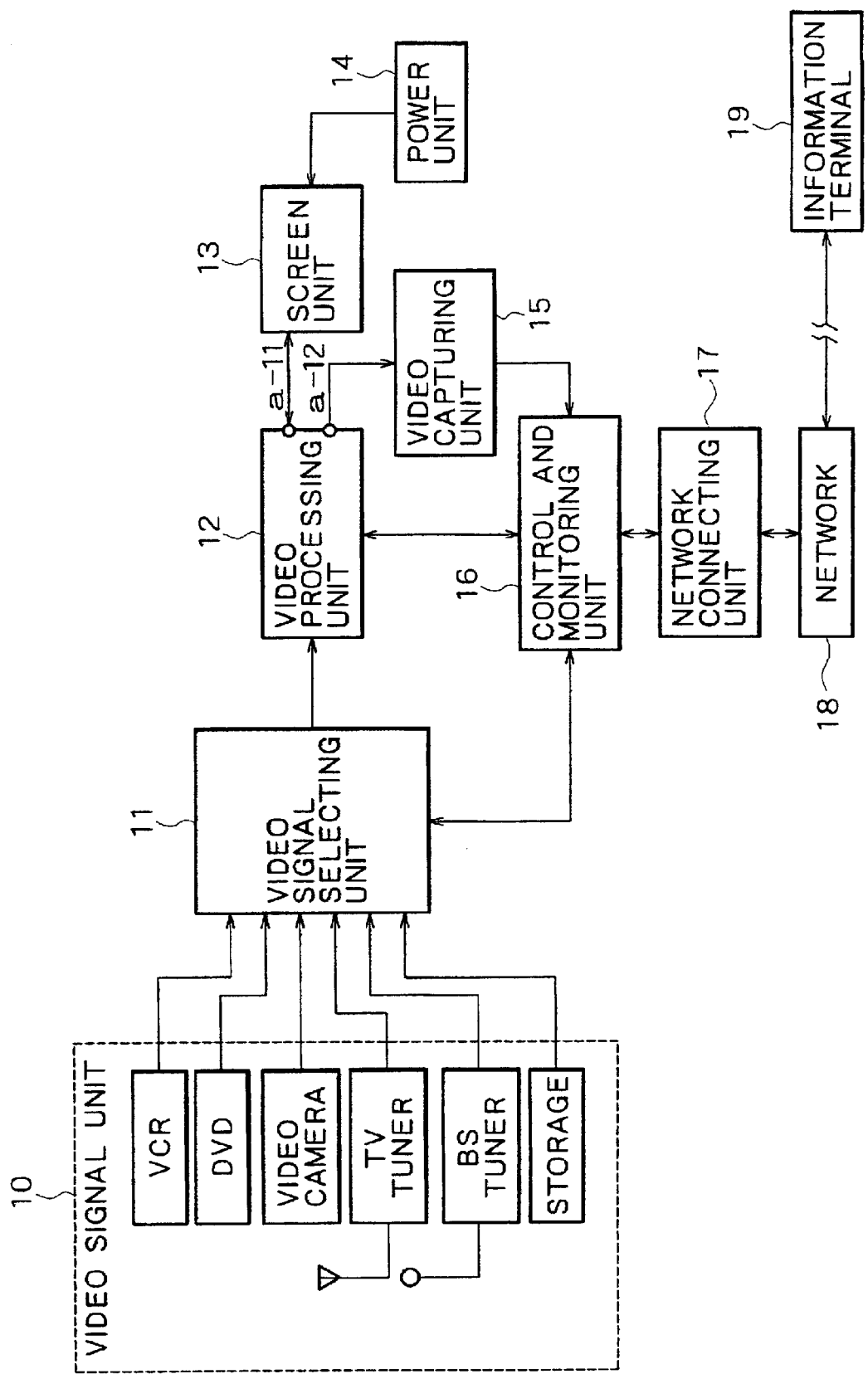
FIG. 1 is a block diagram showing configuration of a display control system to which the present invention is applied.

The present invention is applied to a display system 1 as shown in FIG. 1, for example.

The display system 1 comprises: a video signal unit 10; a video signal selecting unit 11; a video processing unit 12; a screen unit 13 formed by a plurality of display units; a power unit 14; a video capturing unit 15; and a control and monitoring unit 16. The video signal unit 10, the screen unit 13 formed by a plurality of display units, and the power unit 14 form a display apparatus for displaying an input video signal as one screen.

The display system 1 is connected to a network 18 via a network connecting unit 17 which is connected to the control and monitoring unit 16. Further, the network 18 is connected with a plurality of networks and a plurality of information terminals 19.

The video signal unit 10 is connected with apparatus such for example as a VCR (Video Cassette Recorder), a DVD (Digital Versatile Disc) (trademark), a video camera, a TV tuner, a satellite broadcasting tuner, and a storage. The video signal unit 10 supplies video signals to the video signal selecting unit 11.

The video signal selecting unit 11 selects a specified video signal from the plurality of video signals supplied from the video signal unit 10. The video signal selecting unit 11 then supplies the selected video signal to the video processing unit 12. Connected to the control and monitoring unit 16, the video signal selecting unit 11 selects a video signal and controls a schedule of video signals to be displayed on the basis of a signal from the control and monitoring unit 16.

The video processing unit 12 subjects the video signal supplied from the video signal selecting unit 11 to video processing so that the video signal is divided and displayed by the display units, and thereby generates a post-processing video signal. The video processing unit 12 has a first video signal output terminal a-11 and a second video signal output terminal a-12. The first video signal output terminal a-11 provided to the video processing unit 12 is connected to the screen unit 13 to supply the post-processing video signal to the screen unit 13, whereas the second video signal output terminal a-12 is connected to the video capturing unit 15 to supply the post-processing video signal to the video capturing unit 15.

Also, the video processing unit 12 is connected to the screen unit 13 and the control and monitoring unit 16. In addition, the video processing unit 12 has a composite video output terminal for outputting the post-processing video signal to an external display apparatus.

Figure 2:
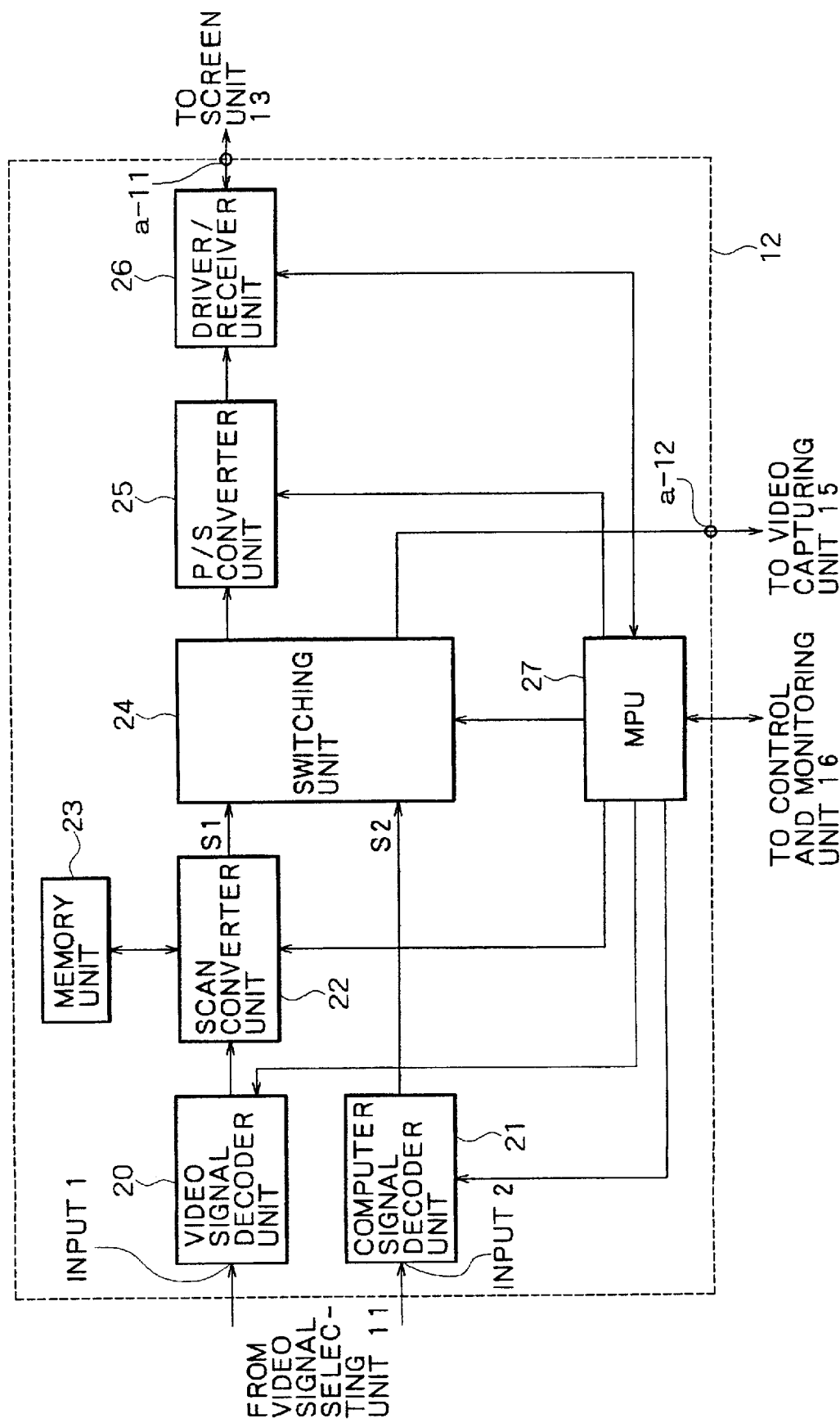
FIG. 2 is a block diagram showing configuration of a video processing unit provided in the display control system to which the present invention is applied.

Operation of the video processing unit 12 will be described with reference to FIG. 2. As shown in FIG. 2, the video processing unit 12 comprises: a video signal decoder unit 20; a computer signal decoder unit 21; a scan converter unit 22; a memory unit 23; a switching unit 24; a parallel/serial (P/S) converter unit 25; a driver/receiver unit 26; and an MPU 27.

The video signal decoder unit 20 has a video signal input terminal Input 1. The video signal decoder unit 20 decodes a composite video signal, a component video signal, an RGB video signal or the like supplied from the video signal selecting unit 11 via the Input 1, and then supplies the result to the scan converter unit 22. The computer signal decoder unit 21 has a computer signal input terminal Input 2. The computer signal decoder unit 21 decodes an RGB computer signal supplied from the video signal selecting unit 11 via the Input 2, and then supplies an output signal S2 to the switching unit 24. The scan converter unit 22 makes size adjustment and/or position adjustment of a video signal supplied from the video signal decoder unit 20 in response to an instruction from the MPU 27, and then supplies an output signal S1 after the adjustment to the switching unit 24. The memory unit 23 temporarily stores the video signal when the scan converter unit 22 makes the size adjustment and/or the position adjustment of the video signal.

Figure 3A:
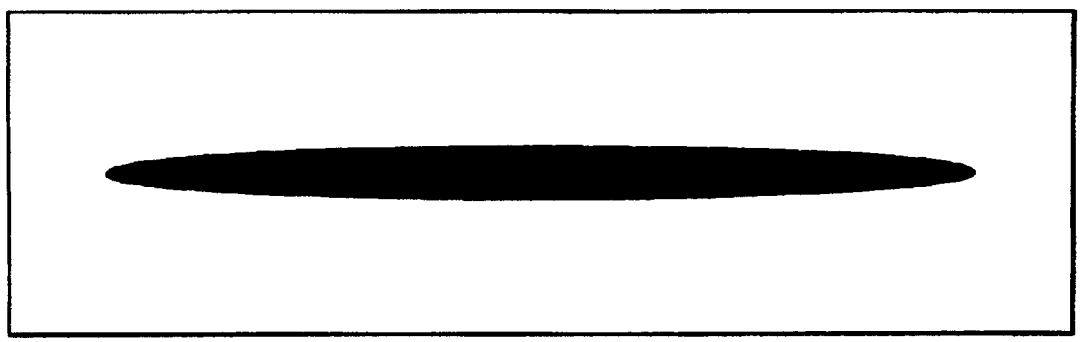
FIG. 3A shows an example of an output signal S1 of a scan converter unit in the video processing unit; 3B shows an example of an output signal S2 of a computer signal decoder unit; and 3B shows an example of a composite signal S3 obtained by combining the output signal S1 and the output signal S2, respectively.
Figure 3B:
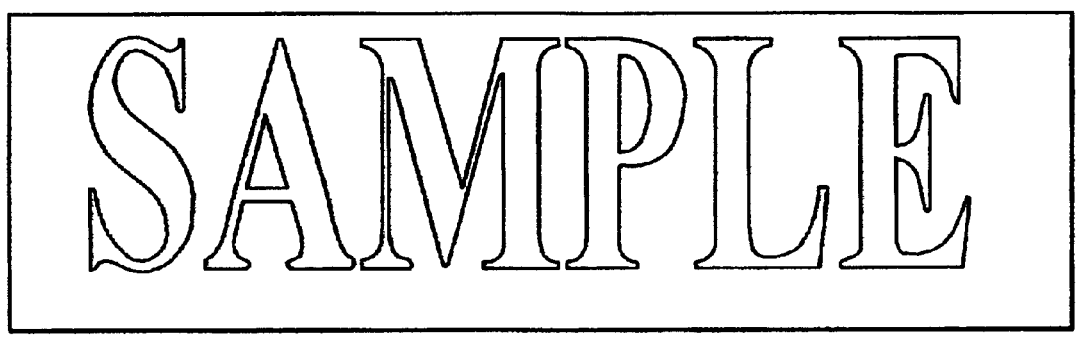
Figure 3C:
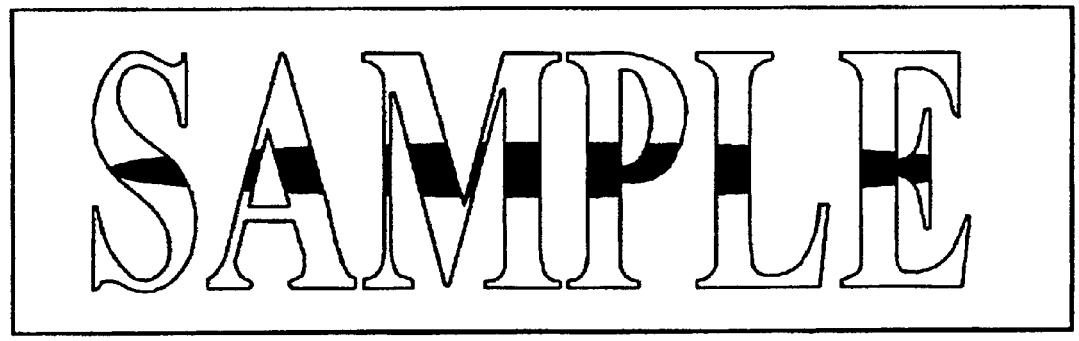

The switching unit 24 performs switching to the output signal S1, the output signal S2, or a composite signal S3 obtained by combining the output signal S1 and the output signal S2 when the switching unit 24 is supplied with the output signal S1 from the scan converter unit 22 and the output signal S2 from the computer signal decoder unit 21. The switching unit 24 supplies the P/S converter unit 25 and the video capturing unit 15 with the signal to which switching is performed. FIG. 3A shows an example of the output signal S1 of the scan converter unit 22. FIG. 3B shows an example of the output signal S2 of the computer signal decoder unit 21. FIG. 3C shows an example of the composite signal obtained by combining the output signal S1 and the output signal S2. The composite signal S3 is obtained by superimposing the image of the output signal S1 on a monochromatic portion of the image of the output signal S2.

The P/S converter unit 25 converts the signal supplied from the switching unit 24 into a signal suitable for the screen unit 13. The driver/receiver unit 26 supplies the signal fed from the P/S converter unit 25 to the screen unit 13. Also, the driver/receiver unit 26 supplies screen information from the screen unit 13, which will be described later, to the MPU 27. The MPU 27 issues an instruction for control of size adjustment, position adjustment and the like to the scan converter unit 22, and issues a switching instruction to the switching unit 24. The MPU 27 supplies the P/S converter unit 25 with additional data from the control and monitoring unit 16. The MPU 27 also controls the video signal decoder unit 20, the computer signal decoder unit 21, and the driver/receiver unit 26.

The screen unit 13 displays the post-processing video signal supplied from the first video signal output terminal a-11 of the video processing unit 12 as a display image.

The screen unit 13 will be described in the following.

Figure 4:
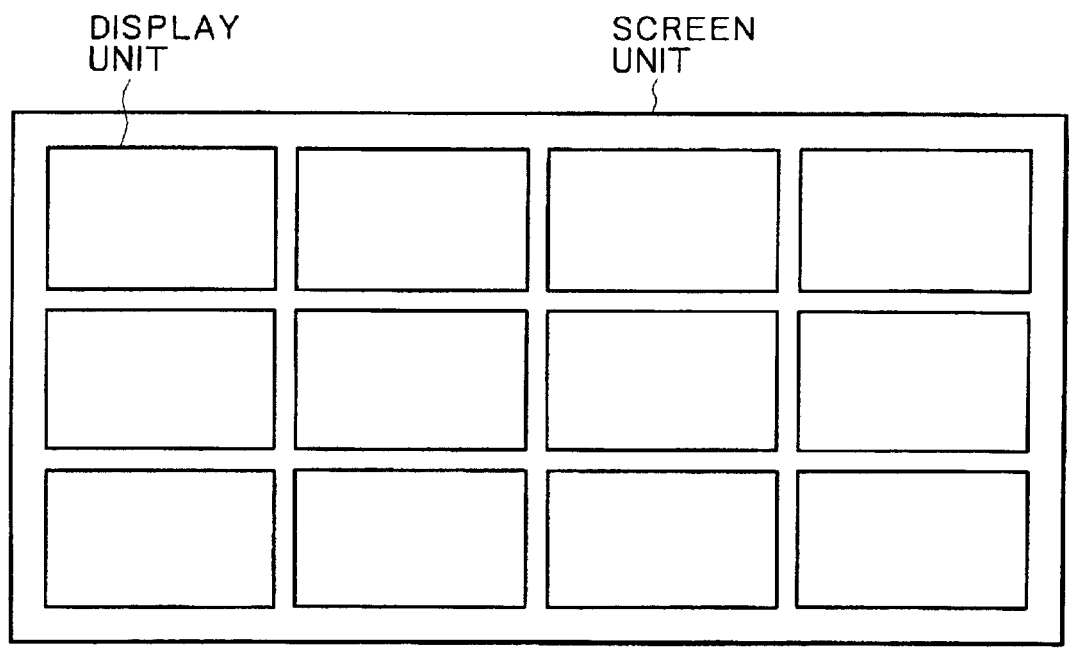
FIG. 4 is a diagram showing that a screen unit provided in the display control system is formed by a plurality of display units.
Figure 5:
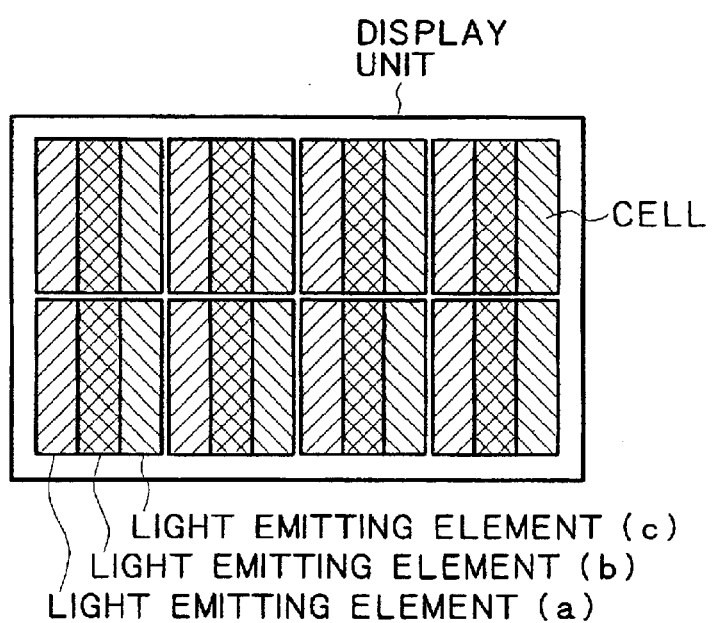
FIG. 5 is a diagram showing that a display unit forming the screen unit provided in the display control system is formed by a plurality of cells.

The screen unit 13 is a large video display apparatus formed by a plurality of display units as shown in FIG. 4, and a display unit is further formed by a plurality of cells. The cells each formed by light emitting elements shown in FIG. 5 such as light emitting diodes are arranged in a matrix manner in a display unit of the screen unit 13. A cell is formed by a light emitting element (a), a light emitting element (b), and a light emitting element (c), for example. The light emitting element (a) may be a blue light emitter, the light emitting element (b) may be a red light emitter, and the light emitting element (c) may be a green light emitter. The cell may also be formed by arranging therein a plurality of light emitting element groups each of which has a set of the light emitting element (a), the light emitting element (b), and the light emitting element (c).

Figure 6:
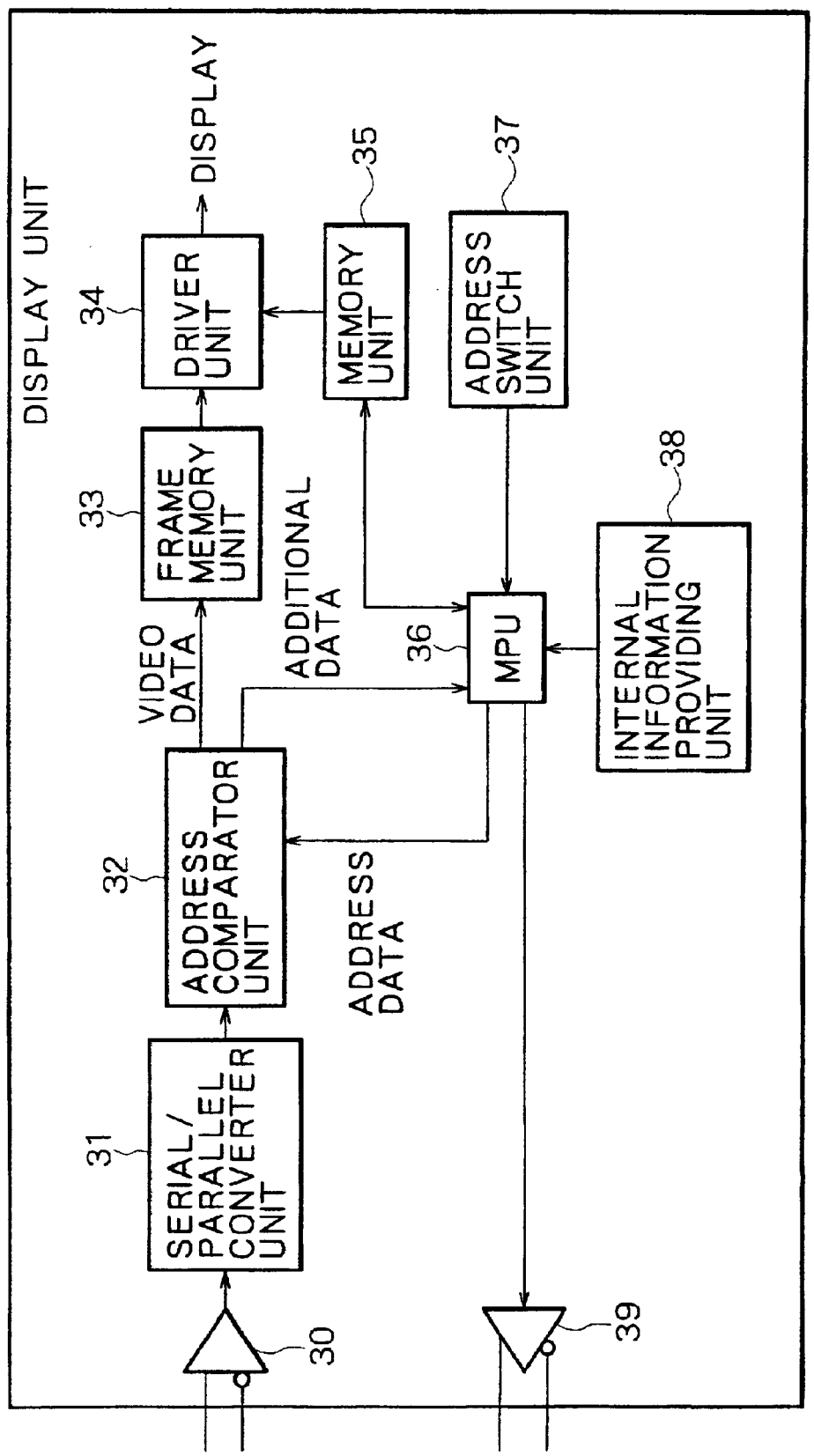
FIG. 6 is a block diagram showing configuration of a display unit forming the screen unit provided in the display control system to which the present invention is applied.
Figure 7:
FIG. 7 is a diagram of assistance in explaining a post-processing video signal supplied from the video processing unit to the screen unit provided in the display control system to which the present invention is applied.

Operation of an individual display unit will next be described with reference to FIG. 6. As shown in FIG. 6, a display unit comprises: a line receiver 30 for receiving the post-processing video signal supplied from the video processing unit 12; a serial/parallel converter unit 31; an address comparator 32; a frame memory unit 33; a driver unit 34; a memory unit 35; an MPU 36; an address switch unit 37; an internal information providing unit 38; and a line driver 39. The post-processing video signal received by the line receiver 30 is subjected to parallel conversion by the serial/parallel converter unit 31, and then supplied to the address comparator 32. The post-processing video signal supplied from the video processing unit 12 is formed by line address data, image data, and additional data necessary for video display, as shown in FIG. 7.

Since the screen unit 13 is formed by a matrix of the plurality of display units, as described above, video data required by one display unit is different from that of another display unit. Therefore, in order to determine whether the post-processing video signal supplied from the serial/parallel converter unit 31 is necessary data for the display unit, the address comparator 32 compares the line address data of the post-processing video signal with address data supplied from the MPU 36. When the line address data coincides with the address data, the address comparator 32 separates the post-processing video signal into video data and additional data, and then supplies the video data to the frame memory unit 33 and supplies the additional data to the MPU 36. The frame memory unit 33 generates an image frame on the basis of the video data supplied from the address comparator 32, and then supplies the image frame to the driver unit 34. The driver unit 34 displays the image frame supplied from the frame memory unit 33 while referring to correction data supplied from the memory unit 35 as required.

The MPU 36 is connected with the address comparator 32, the memory unit 35, the address switch unit 37, and the line driver 39. The MPU 36 supplies the address data supplied from the address switch unit 37 to the address comparator 32. Also, the MPU 36 superimposes data supplied from the internal information providing unit 38 upon the additional data supplied from the address comparator 32, and then supplies the result to the line driver 39. The address switch unit 37 supplies the preset address data of the display unit to the MPU 36. The internal information providing unit 38 supplies the MPU 36 with abnormality information such for example as fan stop information outputted when a fan is stopped, temperature abnormality information outputted when a sensor detects a temperature abnormality within the display unit, and power abnormality information outputted when an abnormality has occurred in power supply voltage. The power abnormality information is generated when a light emitting element (a), a light emitting element (b), and a light emitting element (c) forming a cell of the display unit, for example, are set to emit light at +5 V, +12 V, and +24 V, respectively, and a voltage value of any of the light emitting elements is lowered.

The line driver 39 outputs the additional data supplied from the MPU 36. The additional data outputted from the line driver 39 is supplied to the video processing unit 12 as screen information.

Figure 8:
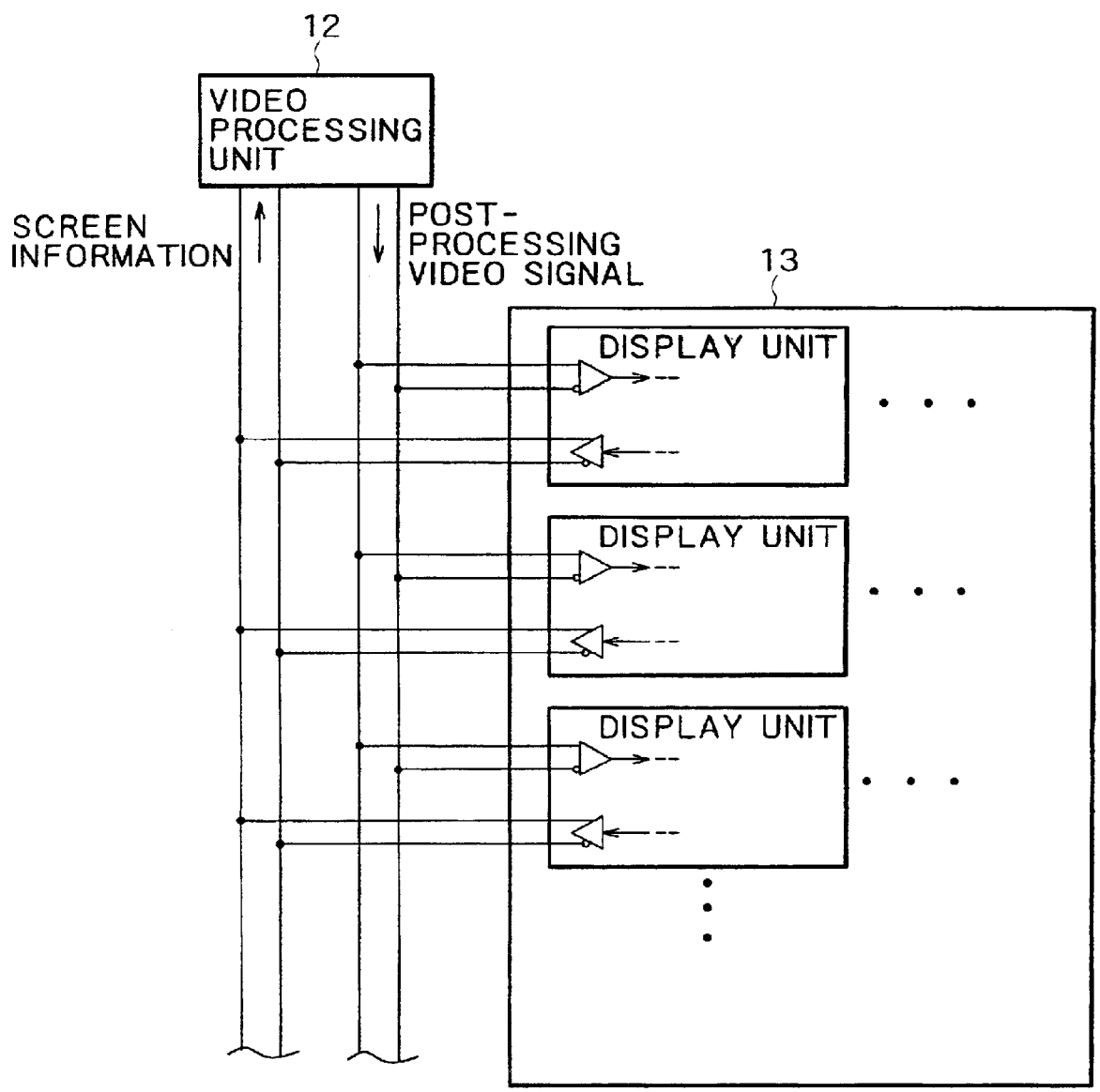
FIG. 8 is a diagram of assistance in explaining signals transmitted and received between the video processing unit and the screen unit provided in the display control system to which the present invention is applied.

As shown in FIG. 8, the post-processing video signal is supplied from the video processing unit 12 to the plurality of display units of the screen unit 13, and the screen information generated by each of the display units is supplied to the video processing unit 12.

The setting of display unit information and cell information included in the above-mentioned screen information will next be described with reference to FIG. 9 and FIG. 10.

As shown in FIG. 9, the screen unit 13 has a number of display units in a horizontal direction of 10 and a number of display units in a vertical direction of 15, and is thus formed by a total of 150 display units, for example. Incidentally, the horizontal direction is set to be an X-direction and the vertical direction is set to be a Y-direction.

The screen unit 13 sets the display unit information by setting a display unit at the uppermost and leftmost position (X=1, Y=1) to be a display unit 1 and setting a display unit at the lowermost and rightmost position (X=10, Y=15) to be a display unit 150, for example.

Figure 10:
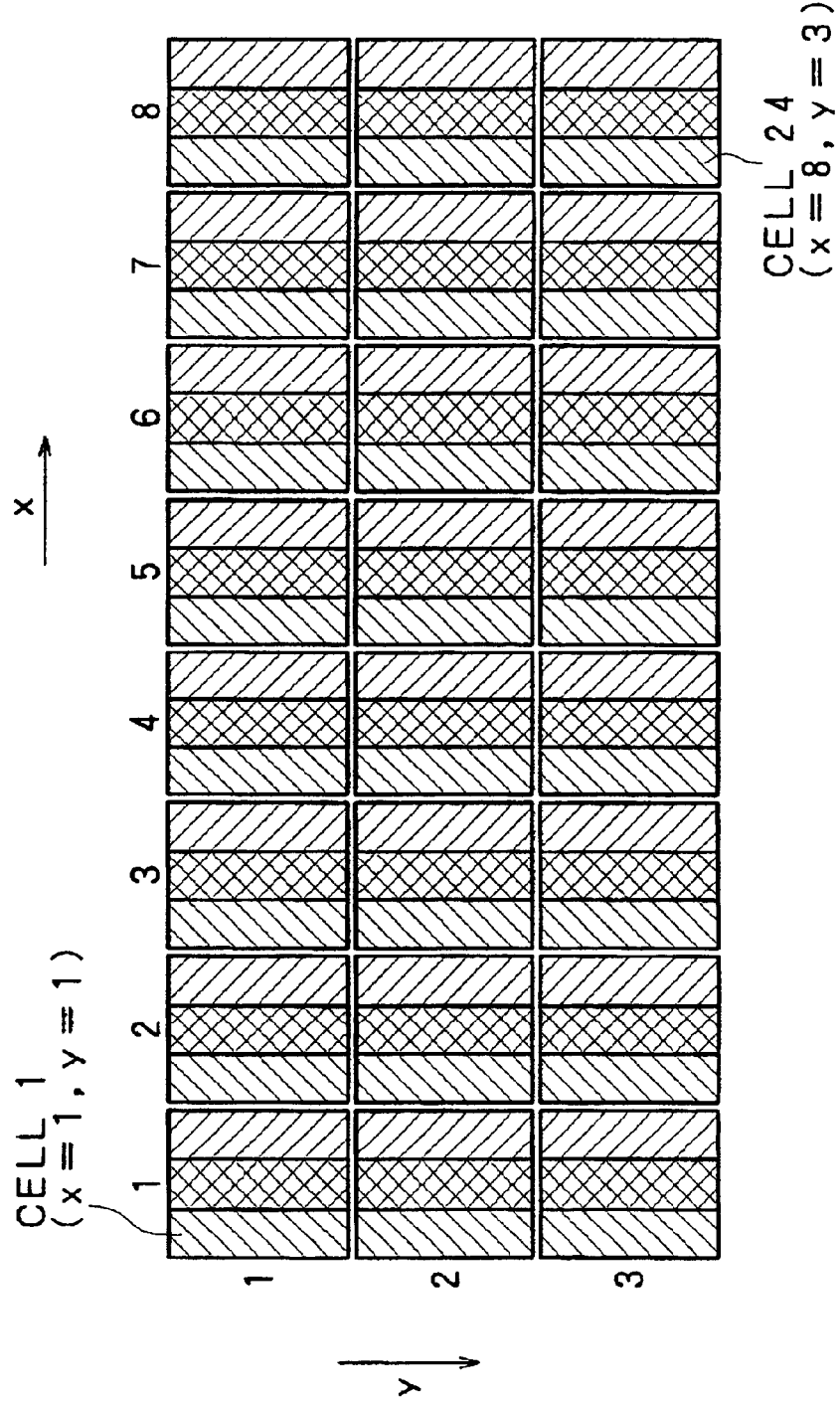
FIG. 10 illustrates the setting of cell information of cells forming a display unit of the screen unit in which information is supplied to the control and monitoring unit to which the present invention is applied.

As shown in FIG. 10, the display unit 1 has a number of cells in a horizontal direction of 8 and a number of cells in a vertical direction of 3, and is thus formed by a total of 24 cells, for example. Incidentally, the horizontal direction is set to be an x-direction and the vertical direction is set to be a y-direction.

The display unit sets the cell information by setting a cell at the uppermost and leftmost position (x=1, y=1) as a cell 1 and setting a cell at the lowermost and rightmost position (x=8, y=3) as a cell 24, for example.

"Display unit 1-cell 1" indicates the position of the cell 1 (x=1, y=1) in the display unit 1 (X=1, Y=1) of the screen unit 13.

Information of each of the display units and cells is set in the same manner as described above to generate screen information in conjunction with the above-mentioned additional data.

The screen unit 13 may supply the screen information directly to the control and monitoring unit 16 via the video processing unit 12, or may supply the screen information to the video processing unit 12 so that the screen information is supplied to the control and monitoring unit 16 when requested by the control and monitoring unit 16.

The power unit 14 supplies power to the screen unit 13.

The video capturing unit 15 is for example a video capture board, which is an expansion board having a function of digitizing video images from a video camera or a videocassette recorder and feeding the video images to a computer.

The video capturing unit 15 is supplied with the post-processing video signal from the video signal output terminal a-12 provided to the video processing unit 12 The video capturing unit 15 generates a post-conversion video signal by converting the post-processing video signal into a video signal suitable for the control and monitoring unit 16. Then, the video capturing unit 15 supplies the post-conversion video signal to the control and monitoring unit 16.

The control and monitoring unit 16 is for example a personal computer apparatus (hereinafter referred to as a PC), comprising: storage means such as a hard disk or a memory for storing data and programs necessary for processing; a CPU (Central Processing Unit) for carrying out arithmetic processing on data received via a communication line and data received from the storage means; and a display unit for displaying a result of the arithmetic processing on a CRT display or the like. The PC also has a keyboard as input means, a mouse pointer as selecting means and the like, and operates under an OS (Operating System) environment adopting a GUI (Graphical User Interface).

The control and monitoring unit 16 is connected to the video signal selecting unit 11 and the video processing unit 12. The control and monitoring unit 16 controls the selection of a video signal by the video signal selecting unit 11, and controls video processing by the video processing unit 12. The control and monitoring unit 16 also controls a schedule of video signals from the video signal selecting unit 11. Furthermore, the control and monitoring unit 16 is supplied with the foregoing screen information from the video processing unit 12.

In addition, the control and monitoring unit 16 is supplied with the post-conversion video signal resulting from conversion by the video capturing unit 15.

The control and monitoring unit 16 has the network connecting unit 17.

The network connecting unit 17 is for example a modem for connecting to the Internet.

The network 18 is for example the Internet. The network 18 is connected to the control and monitoring unit 16 via the network connecting unit 17, and also connected to a plurality of information terminals 19 via a connecting apparatus such as a modem.

The display system 1 also includes an audio signal unit comprising: an audio signal input unit for inputting and outputting the audio signal corresponding to the video signal of the screen unit 13; an audio signal processing unit for carrying out signal processing and the like on the audio signal inputted thereto; and an audio signal output unit for outputting the audio signal after the processing.

Figure 11:
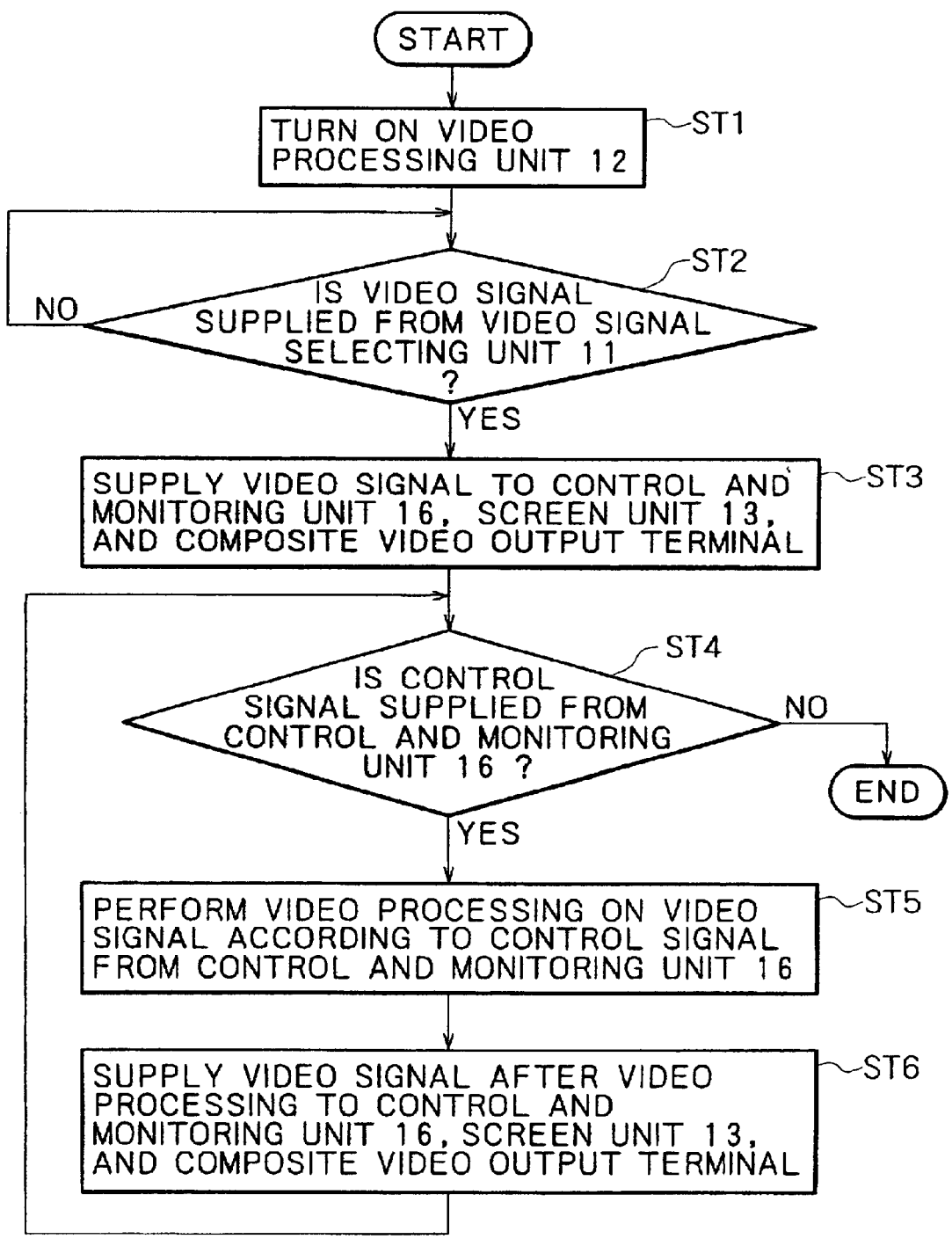
FIG. 11 is a flowchart illustrating an example of operation of the video processing unit provided in the display control system to which the present invention is applied.

A series of processing steps in the operation of the video processing unit 12 will be described in the following with reference to a flowchart shown in FIG. 11.

At a step ST1, the video processing unit 12 is supplied with power to be brought into an activated state.

At a step ST2, the video processing unit 12 determines whether a video signal is supplied from the video signal selecting unit 11. When the video processing unit 12 determines that a video signal is supplied from the video signal selecting unit 11, the video processing unit 12 proceeds to a step ST3.

At the step ST3, the video processing unit 12 supplies the video signal to the screen unit 13, the control and monitoring unit 16, and the composite video output terminal provided in the video processing unit 12.

At a step ST4, the video processing unit 12 determines whether a control signal is supplied from the control and monitoring unit 16. When the video processing unit 12 determines that a control signal is supplied from the control and monitoring unit 16, the video processing unit 12 proceeds to a step ST5.

At the step ST5, the video processing unit 12 performs video processing on the video signal according to the control signal supplied from the control and monitoring unit 16.

At a step ST6, the video processing unit 12 supplies a post-processing video signal obtained by the video processing to the screen unit 13, the control and monitoring unit 16, and the composite video output terminal provided in the video processing unit 12. When the video processing unit 12 performs video processing again on the post-processing video signal obtained by the video processing at the step ST5, the video processing unit 12 repeats the steps ST4 to ST6.

Operation of the control and monitoring unit 16 will be described in the following with reference to FIG. 12 and FIG. 13.

Figure 12:
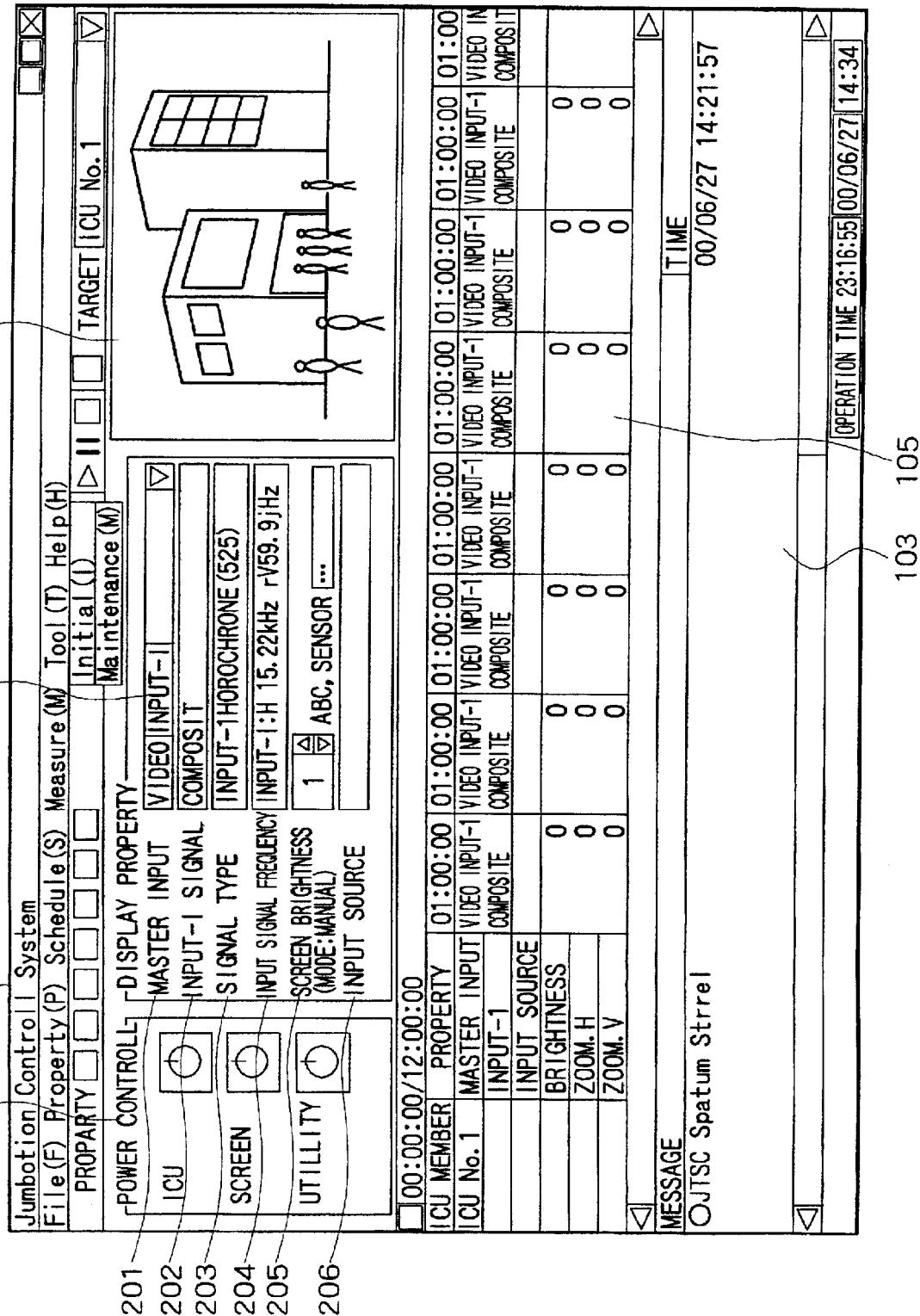
FIG. 12 shows a GUI of a display system information providing window for displaying a state of operation of the display control system to which the present invention is applied, a display image displayed on the screen unit, information about the display image and the like for control of the display control system.

A display system information providing window 100 shown in FIG. 12 displays a state of operation of the display system 1, information about a video signal and the like on the display unit of the control and monitoring unit 16 by an application program adopting a GUI which program is loaded from the storage means such as a hard disk and executed by the CPU. Also, the display system information providing window 100 controls adjustment of the display position, size and the like of a display image.

The display system information providing window 100 has a power control portion 101, a display information portion 102, a message portion 103, an image display portion 104, and a schedule control portion 105.

The power control portion 101 controls supply of power to apparatus connected to the display system 1, such as the video signal selecting unit 11, the video processing unit 12, and the screen unit 13. The power control portion 101 for example controls supply of power to the power unit 14 to thereby effect on-off control of power to the screen unit 13. Also, the power control portion 101 displays a state of power supply to each of the apparatus.

The display information portion 102 regularly requests video signal information from the video processing unit 12, receives necessary data, and thereby displays the video signal information and a state of operation of the display system 1 in real time. The display information portion 102 may receive the video signal information when the video signal supplied to the video processing unit 12 is changed.

The display information portion 102 further comprises an input video signal display portion 201, an input display portion 202, a signal type display portion 203, an input signal frequency display portion 204, a screen brightness display portion 205, and an input source display portion 206.

The input video signal display portion 201 displays the type of a video signal inputted to the video processing unit 12. When the video signal is inputted from the VCR, for example, the input video signal display portion 201 displays "Input 1." In the case of a computer signal generated by computer graphics, the input video signal display portion 201 displays "Input 2." In the case of a composite signal generated by combining a video signal and a computer signal, the input video signal display portion 201 displays "Input 3."

The input display portion 202 displays a video specification of the video signal inputted to the video processing unit 12. When the video signal is inputted from the VCR to the video processing unit 12, for example, the input display portion 202 displays "COMPOSITE," "RGB" or the like in correspondence with the VCR.

The signal type display portion 203 displays a broadcast system corresponding to the video signal inputted to the video processing unit 12. The signal type display portion 203 displays "NTSC" or "PAL," for example, in correspondence with the video signal inputted to the video processing unit 12.

The input signal frequency display portion 204 displays horizontal frequency and vertical frequency of the video signal inputted to the video processing unit 12.

The screen brightness display portion 205 displays the brightness of the screen unit 13. The screen brightness display portion 205 indicates the brightness of the screen unit 13 on a scale of one to ten with "5" serving as a standard value, for example, and thus displays a numerical value in a range of "1" to "10."

The input source display portion 206 displays the name of an apparatus that sends the video signal to the video processing unit 12. When the apparatus that sends the video signal to the video processing unit 12 is the DVD, for example, the input source display portion 206 displays "DVD."

The message portion 103 displays error information of the display system 1, the time of receiving the error information and the like. The message portion 103 may also display operating information of the power control portion 101 and the image display portion 104 as distinct from the error information.

The image display portion 104 displays the post-conversion video signal supplied from the video capturing unit 15 to the control and monitoring unit 16 as a display image.

The display image displayed in the image display portion 104 is adjusted in display position, size and the like by a display image adjusting menu 30, which will be described later and is an application program shown as a GUI. The display size of the image display portion 104 may be enlarged or reduced for easy viewing.

The schedule control portion 105 controls a schedule of video signal selection when the video signal selecting unit 11 sequentially selects a plurality of video signals supplied from the video signal unit 10.

The display image adjusting menu 30 for adjusting the size and position of the display image displayed on the screen unit 13 formed by a plurality of display units will be described in the following with reference to FIG. 13.

The display image adjusting menu 30 is started as another GUI by clicking a mouse on the image display portion 104 shown in FIG. 12, for example. The display image adjusting menu 30 may be started by methods other than that described above.

The display image adjusting menu 30 has menus such as a geometry 300 for adjusting the display image displayed on the screen unit 13.

The geometry 300 has a position adjusting portion 301, a size adjusting portion 302, and a display image adjusting window 303.

Figure 13:
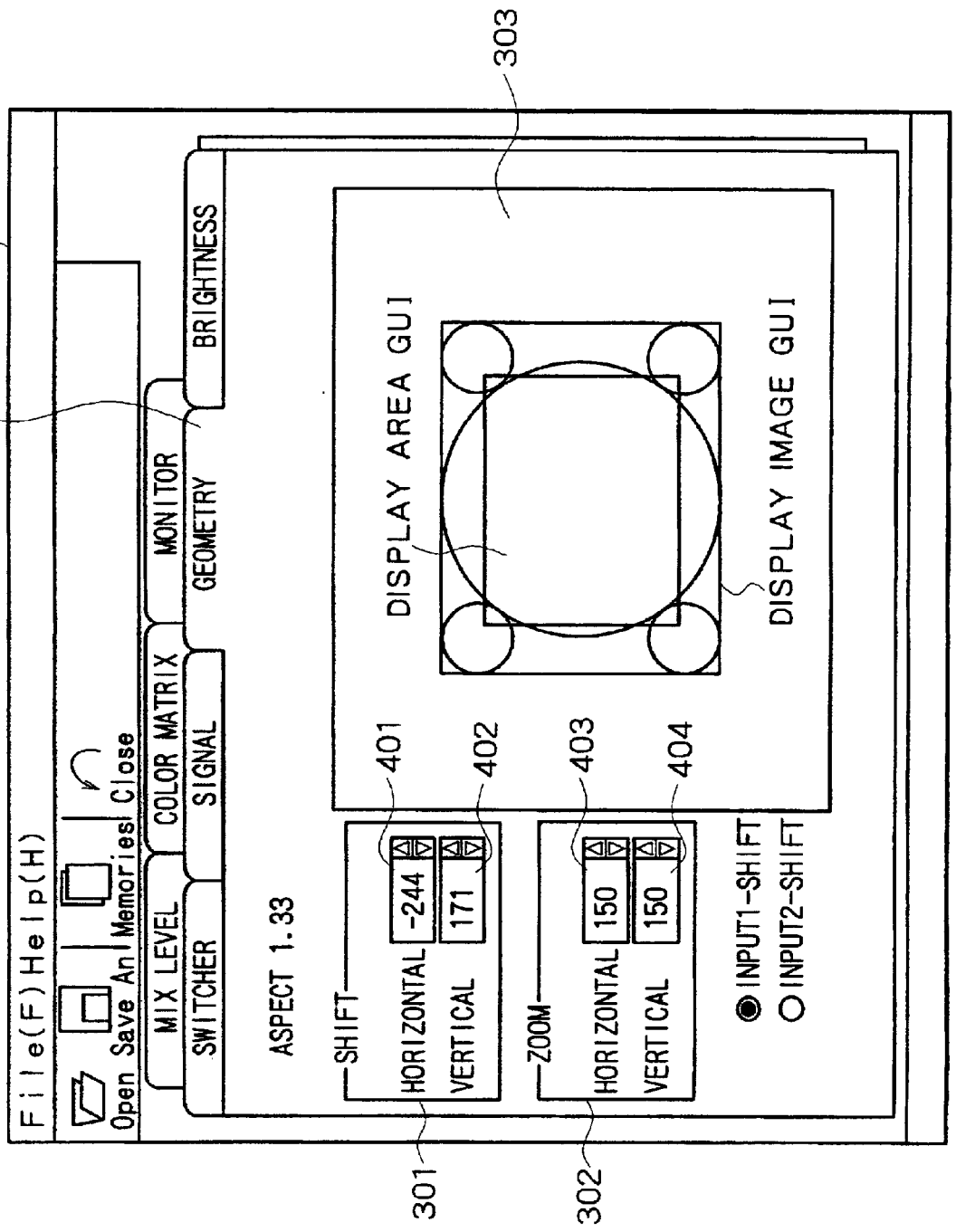
FIG. 13 shows a GUI of a display image adjusting window for adjusting the size and position of the display image displayed on the screen unit provided in the display control system to which the present invention is applied.
Figure 14:
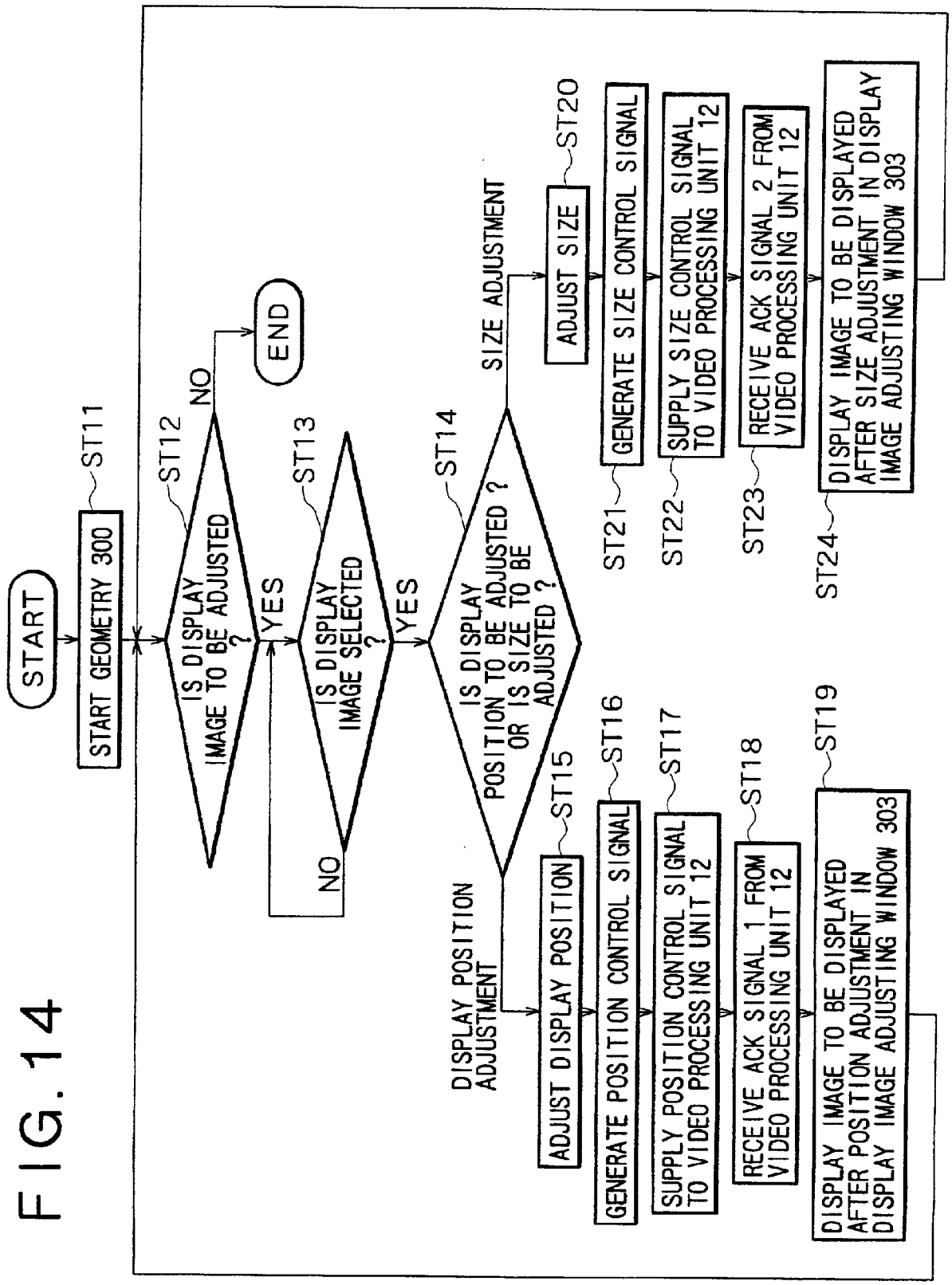
FIG. 14 is a flowchart illustrating an example of adjustment of the size and position of the display image by the control and monitoring unit provided in the display control system to which the present invention is applied.

As shown in FIG. 13, the position adjusting portion 301 has a display window that indicates a horizontal position 401 and a vertical position 402 by a numerical value. The position adjusting portion 301 adjusts the position of the display image displayed on the screen unit 13.

The size adjusting portion 302 has a display window that indicates a horizontal position 403 and a vertical position 404 by a numerical value. The size adjusting portion 302 adjusts the size of the display image displayed on the screen unit 13.

The display image adjusting window 303 displays a display area GUI showing the area of the display image displayed on the screen unit 13, and a display image GUI showing the position and size of the image displayed on the screen unit 13.

A series of processing steps in adjustment of the display position and size of the display image by the control and monitoring unit 16 using the geometry 300 will next be described with reference to a flowchart shown in FIG. 14, and FIGS. 15A, 15B, and 15C, which are diagrams of assistance in explaining the adjustment of the display position and size of the display image displayed on the screen unit 13 by controlling a display image displayed in the display image adjusting window 303.

Figure 15A:
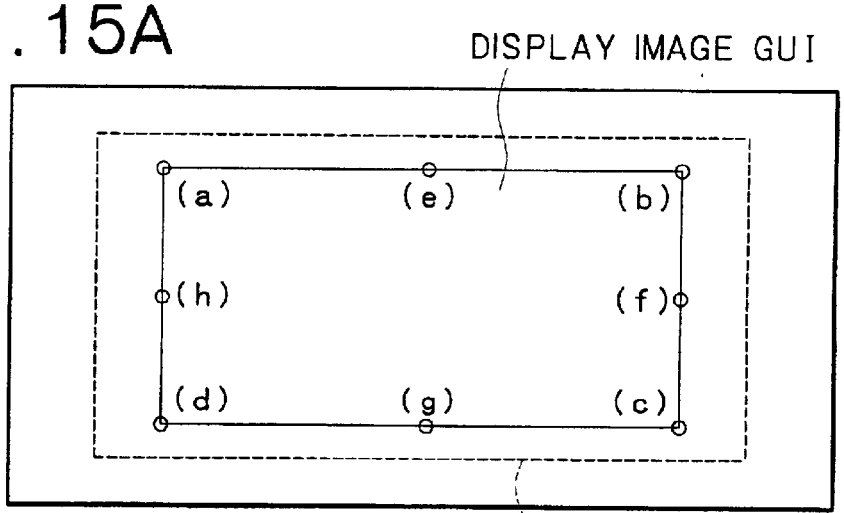
FIGS. 15A, 15B, and 15C illustrate the adjustment of the size and position of the display image by the control and monitoring unit provided in the display control system to which the present invention is applied.

The control and monitoring unit 16 takes, as initial settings, a state in which the adjustment of the display image is not made yet by means of the position adjusting portion 301 and/or the size adjusting portion 302 provided in the geometry 300 of the display image adjusting menu 30. The control and monitoring unit 16 displays a display image GUI and a display area GUI reflecting the initial settings in the display image adjusting window 303 as shown in FIG. 15A. The control and monitoring unit 16 adjusts the display image by means of the geometry 300 by taking the initial settings as reference values.

At a step ST11, the control and monitoring unit 16 selects the geometry 300 from the display image adjusting menu 30. The geometry 300 may be displayed by methods other than that described above.

At a step ST12, the control and monitoring unit 16 determines whether the display image displayed in the geometry 300 is to be adjusted or not. When the display image displayed in the geometry 300 is to be adjusted, the control and monitoring unit 16 proceeds to a step ST13.

At the step ST13, the control and monitoring unit 16 determines whether the display image displayed in the geometry 300 is selected.

Operation of selecting the display image will be described with reference to FIG. 15A.

The control and monitoring unit 16 selects the display image GUI displayed in the display image adjusting window 303 as shown in FIG. 15A by a click of a mouse, for example. The above operation of selecting the display image GUI enables the control and monitoring unit 16 to adjust the display position and/or size of the display image. The display image GUI displayed in the display image adjusting window 303 may actually display selection pointers (a) to (h) shown in FIG. 15A in response to the selecting operation.

When the control and monitoring unit 16 determines that the display image displayed in the geometry 300 is selected as described above, the control and monitoring unit 16 proceeds to a step ST14.

At the step ST14, the control and monitoring unit 16 determines whether the display position of the display image displayed in the geometry 300 is to be adjusted or the size of the display image is to be adjusted. When the display position of the display image displayed in the geometry 300 is to be adjusted, the control and monitoring unit 16 proceeds to a step ST15. When the size of the display image displayed in the geometry 300 is to be adjusted, the control and monitoring unit 16 proceeds to a step ST20.

At the step ST15, the control and monitoring unit 16 adjusts the display position of the display image displayed in the geometry 300.

The adjustment of the display position of the display image will be described in the following with reference to FIG. 15B.

Figure 15B:
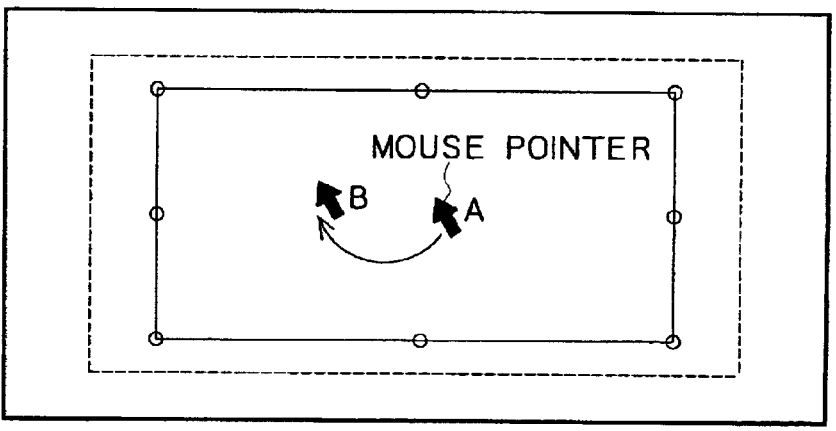

As shown in FIG. 15B, the control and monitoring unit 16 selects the display image GUI displayed in the display image adjusting window 303, moves the mouse to a position within the display image GUI other than at the selection pointers (a) to (h), and then moves the mouse to a given display position while clicking the mouse, which is the so-called dragging of the mouse. For example, the mouse pointer is dragged from a pointer position A to a pointer position B. The control and monitoring unit 16 determines the display position of the display image by releasing the dragging of the mouse at the given display position.

At a step ST16, the control and monitoring unit 16 generates a position control signal in response to the adjustment of the display position of the display image at the step ST15.

At a step ST17, the control and monitoring unit 16 supplies the position control signal to the video processing unit 12. In response to the position control signal, the video processing unit 12 performs signal processing on the video signal to thereby adjust the display position of the display image displayed on the screen unit 13.

At a step ST18, the control and monitoring unit 16 receives an ACK signal 1, which conveys that the position control signal has been received properly, from the video processing unit 12.

At a step ST19, the control and monitoring unit 16 displays the display image adjusted in display position in the display image adjusting window 303. Then, the control and monitoring unit 16 returns to the step ST12 to determine whether the display image is to be adjusted.

At the step ST20, the control and monitoring unit 16 adjusts the size of the display image displayed in the geometry 300.

Operation of adjusting the size of the display image will be described in the following with reference to FIG. 15C.

Figure 15C:
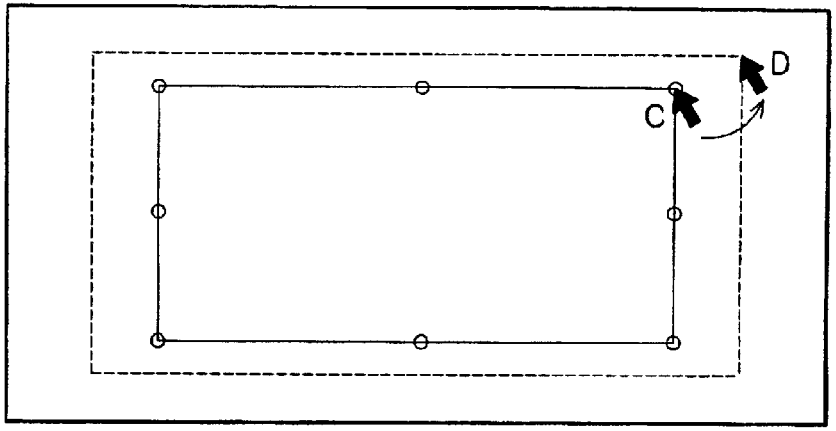

As shown in FIG. 15C, the control and monitoring unit 16 selects the display image GUI displayed in the display image adjusting window 303, points the mouse at one of the selection pointers (a) to (h), and then moves the mouse to a given size while clicking the mouse, which is the so-called dragging of the mouse. For example, the mouse pointer is dragged from a pointer position C to a pointer position D. The control and monitoring unit 16 determines the size of the display image by releasing the dragging of the mouse when the given size is attained. The display image adjusting window 303 may virtually display the display image GUI after the adjustment by using the display area GUI showing the size of the display image after the adjustment as shown in FIG. 15C while the display image GUI is dragged as described above. When the control and monitoring unit 16 points the mouse at one of the selection pointers a to d to adjust the size of the display image, the control and monitoring unit 16 can adjust the size of the display image without changing the aspect ratio of the display image. When the control and monitoring unit 16 points the mouse at the selection pointer (e) or the selection pointer (g) to adjust the size of the display image, the control and monitoring unit 16 can adjust the size of the display image in only a horizontal direction. When the control and monitoring unit 16 points the mouse at the selection pointer (f) or the selection pointer (h) to adjust the size of the display image, the control and monitoring unit 16 can adjust the size of the display image in only a vertical direction.

At a step ST21, the control and monitoring unit 16 generates a size control signal in response to the adjustment of the size of the display image at the step ST20.

At a step ST22, the control and monitoring unit 16 supplies the size control signal to the video processing unit 12. In response to the size control signal for the display image, the video processing unit 12 performs signal processing on the video signal to thereby adjust the size of the display image displayed on the screen unit 13.

At a step ST23, the control and monitoring unit 16 receives an ACK signal 2, which conveys that the size control signal has been received properly, from the video processing unit 12.

At a step ST24, the control and monitoring unit 16 displays the display image adjusted in size in the display image adjusting window 303. Then, the control and monitoring unit 16 returns to the step ST12 to determine whether the display image is to be adjusted.

The control and monitoring unit 16 can also adjust the display position of the display image by directly changing numerical values in the display window of the horizontal position 401 and the vertical position 402, which window is provided in the position adjusting portion 301 of the geometry 300. The display position of the display image may be adjusted by methods other than that described above.

The control and monitoring unit 16 can also adjust the size of the display image by directly changing numerical values in the display window of the horizontal size 403 and the vertical size 404, which window is provided in the size adjusting portion 302 of the geometry 300. The size of the display image may be adjusted by methods other than that described above.

A control signal supplied from the control and monitoring unit 16 to the video processing unit 12 has a structure as shown in FIG. 16, for example.

SID 1 shown in FIG. 16 is a transmitting source display unit ID, that is, the SID 1 indicates an ID number of an apparatus acting as a transmitting source. When the transmitting side is a PC, an ID number assigned to the PC is inputted to the SID 1. DID 1 is a receiving display unit ID, that is, the DID 1 indicates an ID number of an apparatus acting as a receiver. When the receiving side is a processor, an ID number assigned to the processor is inputted to the DID 1. "Reserved" indicates a dummy of 0×20 (fixed). SID 2 indicates a transmitting source procedure ID, that is, an ID number of a procedure of the transmitting source. The transmitting source is provided with several procedures (program functions) for intended processes, and the procedures are each assigned a number. An ID number indicating which procedure is used for processing by the transmitting source is inputted to the SID 2. DID 2 indicates a receiving procedure ID, that is, a procedure ID of the receiver. The receiver is provided with several procedures (program functions) for intended processes, and the procedures are each assigned a number. An ID number indicating which procedure is used for processing by the receiver is inputted to the DID 2. Information of ACK, NACK, GET, and PUT is inputted to CTRL (control). SIZE indicates message size, and the number of bytes comprising a command is inputted to the SIZE. A portion from SYNC to the SIZE is referred to as a message header.

RC indicates an ID number of a resource. A resource is a program within a procedure. Position-X indicates an amount of a shift of an image in a horizontal direction, and is used to control the horizontal display position of the image with respect to the screen unit. Position-Y indicates an amount of a shift of an image in a vertical direction, and is used to control the vertical display position of the image with respect to the screen unit. Size-X indicates the number of display dots in an X-direction, and the number of dots in the horizontal direction of the screen unit is inputted to the Size-X. Size-Y indicates the number of display dots in a Y-direction, and the number of dots in the vertical direction of the screen unit is inputted to the Size-Y. A dot is a component of a cell described above, and refers to an RGB trio. Zoom-X indicates a display scale factor in the X-direction, and is used to control the scale factor for enlarging or reducing the image in the horizontal direction. Zoom-Y indicates a display scale factor in the Y-direction, and is used to control the scale factor for enlarging or reducing the image in the vertical direction. FCS indicates a frame check sequence. The MPU 27 provided in the video processing unit 12 performs arithmetic processing for the Position-X, Position-Y, Size-X, Size-Y, Zoom-X, and Zoom-Y. The scan converter unit 22 adjusts the size and position of the image on the basis of a result of the arithmetic processing. A portion from the RC to SYNC is referred to as a message body.

Schedule control will be described in the following with reference to FIG. 17 and FIG. 18.

The control and monitoring unit 16 performs operations for adjusting the display position, size, brightness and the like of the display image displayed on the screen unit 13 to achieve a specified display form of the display image. The control and monitoring unit 16 carries out file management regarding the data for the adjusting information and the displayed image etc. as one object. The control and monitoring unit 16 generates a plurality of objects each for an input video signal. An object generated is operated by an application program shown as a GUI, as shown in FIG. 17.

The control and monitoring unit 16 also controls a schedule of video signal selection when the video signal selecting unit 11 sequentially selects a plurality of video signals and supplies the video signals to the video processing unit 12. The schedule that controls the video signal selection (hereinafter referred to as the scheduler) is an application program shown as a GUI.

Figure 18:
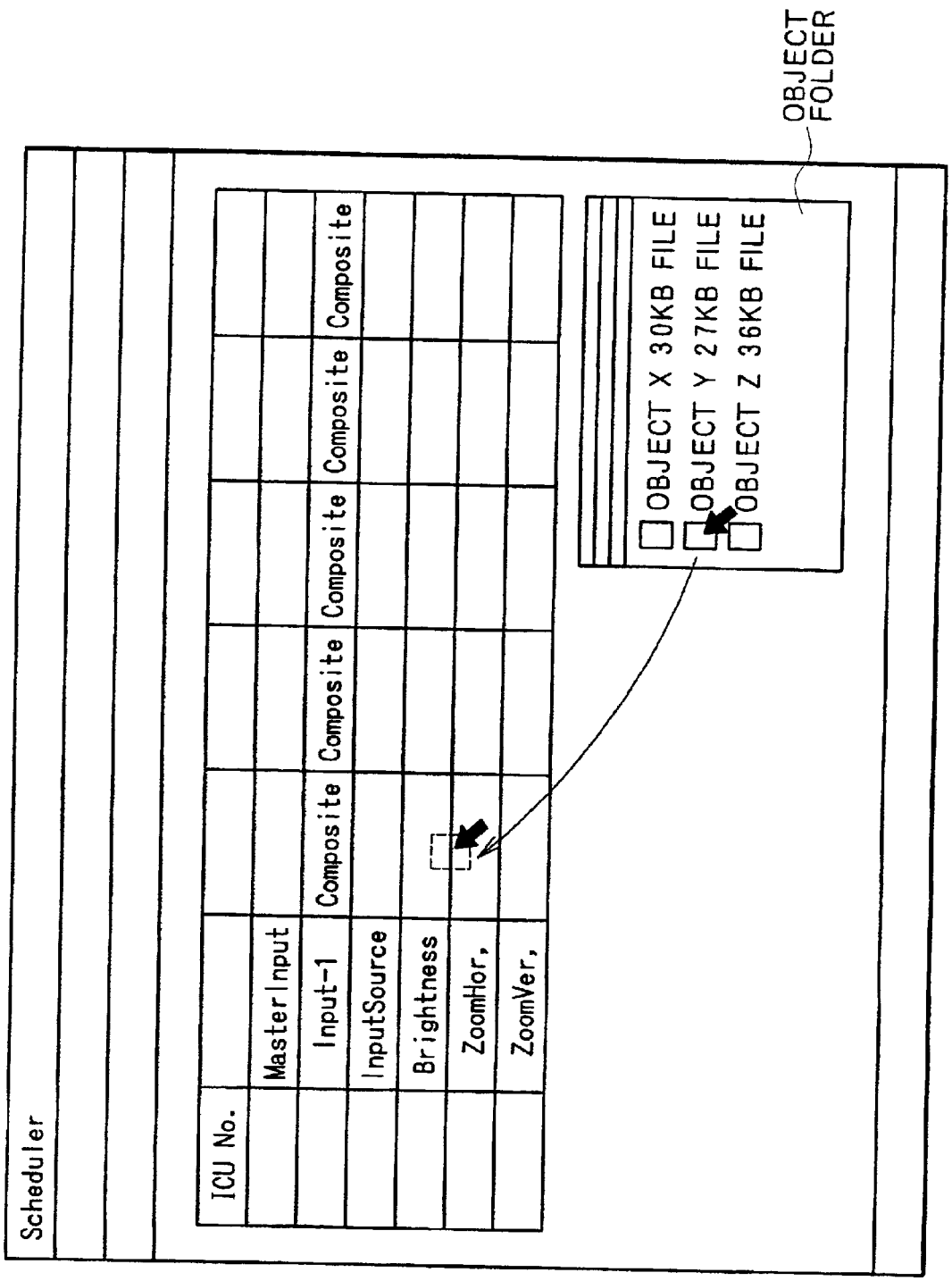
FIG. 18 is a diagram of assistance in explaining the pasting of an object in schedule control by the control and monitoring unit provided in the display control system to which the present invention is applied.
Figure 19:
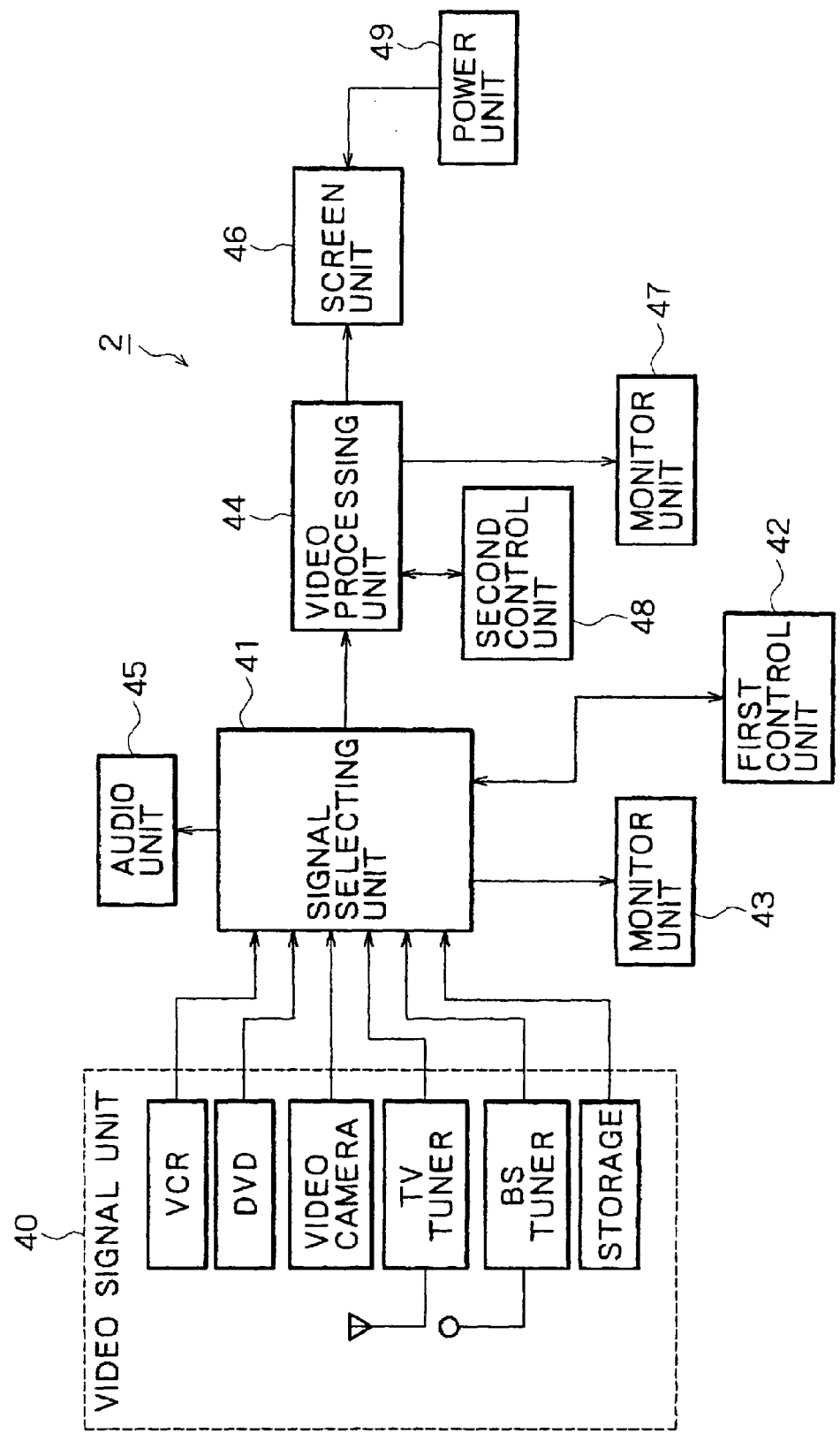
FIG. 19 is a block diagram showing configuration of a conventional display control system.
Figure 20:
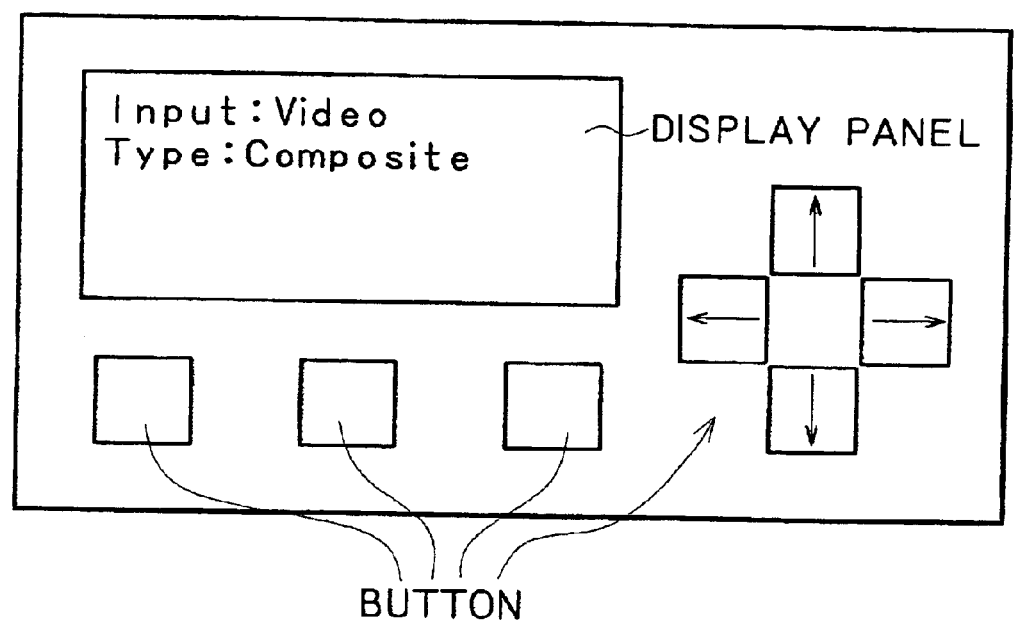
FIG. 20 shows a display panel of a controller provided in the conventional display control system.

The control and monitoring unit 16 pastes a specified object in an object folder shown in FIG. 18 to the scheduler by moving the mouse onto the object, moving the mouse to a given position on the scheduler while clicking the mouse, which is the so-called dragging of the mouse, and then releasing the dragging of the mouse at the given position. The control and monitoring unit 16 may replace an object pasted to the scheduler by the dragging of the mouse. The scheduler may be displayed as an independent GUI or may be provided in the display system information providing window 100 as shown in FIG. 12.

When a schedule is registered in the scheduler in order for the VCR (input video signal: Input 1, input: COMPOSITE, signal type: NTSC, screen brightness: 3, input source: VCR, Zoom Hor.: 20, Zoom Ver.: 80), the DVD (input video signal: Input 1, input: COMPONENT, signal type: NTSC, screen brightness: 2, input source: DVD, Zoom Hor.: 100, Zoom Ver.: 5), and the storage (input video signal: Input 2, input: COMPONENT, signal type: NTSC, screen brightness: 8, input source: storage, Zoom Hor.: 55, Zoom Ver.: 150), for example, the video signal selecting unit 11 of the display system 1 first selects the VCR according to the registered schedule of the scheduler, and then supplies a video signal outputted from the VCR to the control and monitoring unit 16 via the video processing unit 12 and the video capturing unit 15. The control and monitoring unit 16 adjusts the screen brightness of the video signal to 3, the Zoom Hor. to 20, and the Zoom Ver. to 80. The adjusted video signal is subjected to predetermined processing by the video processing unit 12 and then displayed on the screen unit 13. Next, the video signal selecting unit 11 of the display system 1 selects the DVD according to the registered schedule of the scheduler, and then supplies a video signal outputted from the DVD to the control and monitoring unit 16 via the video processing unit 12 and the video capturing unit 15. The control and monitoring unit 16 adjusts the screen brightness of the video signal to 2, the Zoom Hor. to 100, and the Zoom Ver. to 5. The adjusted video signal is subjected to predetermined processing by the video processing unit 12 and then displayed on the screen unit 13. Then, the video signal selecting unit 11 of the display system 1 selects the storage according to the registered schedule of the scheduler, and then supplies a video signal outputted from the storage to the control and monitoring unit 16 via the video processing unit 12 and the video capturing unit 15. The control and monitoring unit 16 adjusts the screen brightness of the video signal to 8, the Zoom Hor. to 55, and the Zoom Ver. to 150. The adjusted video signal is subjected to predetermined processing by the video processing unit 12 and then displayed on the screen unit 13.

Thus, the display system 1 spuriously displays a display image by means of the control and monitoring unit 16 on the basis of display information including at least position information of the display units forming the screen unit 13 and a video signal of the display image displayed on the screen unit 13, adjusts the display image, and reflects a result of the adjustment on the screen unit 13. Therefore, it is possible to adjust the display image displayed on the screen unit 13 without actually observing the screen unit 13.

Also, the display system 1 controls a schedule of the selecting operation of the video signal selecting unit 11 and the video processing operation of the video processing unit 12 by means of the control and monitoring unit 16. Therefore, it is possible to readily make video adjustment of different video signals.

In addition, the control and monitoring unit 16 of the display system 1 is connected to an information terminal 19 via the network connecting unit 17 and the network 18. Therefore, it is possible to remotely adjust the display position, size and the like of the display image displayed on the screen unit 13 to obtain an arbitrary display form of the display image while checking the actual display image by means of the display system information providing window 100. It is also possible to instantly obtain information on a state of operation of the system and the video signal and the like by means of the display system information providing window 100.

Moreover, the control and monitoring unit 16 of the display system 1 performs the operations of the first control unit 42, the supervising monitor unit 43, the checking monitor unit 47, and the second control unit 48 of the display system 2. Thus, the reduction of these operating units results in space savings.

As described above in detail, the display control system according to the present invention spuriously displays a display image by means of the control and monitoring unit on the basis of display information including at least position information of the display units forming the screen unit and a video signal of the display image displayed on the screen unit, adjusts the display image, and reflects a result of the adjustment on the screen unit. Therefore, it is possible to readily adjust the display image while visually checking the display image.

Also, the display control system according to the present invention controls a schedule of the selecting operation of the video signal selecting unit and the video processing operation of the video processing unit by means of the control and monitoring unit. Therefore, it is possible to readily make video adjustment of different video signals.

In addition, the control and monitoring unit of the display control system according to the present invention is connected to an information terminal via the network. Therefore, it is possible to remotely adjust the display image displayed on the screen unit. It is also possible to instantly obtain information on a state of operation of the entire system and the video signal and the like, and thereby collectively control the information of the system.

Moreover, the display control system according to the present invention controls the video signal selecting unit and the video processing unit by means of the control and monitoring unit. Thus, the reduction of the operating units required by the conventional system results in space savings.

As described above in detail, the display control apparatus according to the present invention spuriously displays a display image by means of the control and monitoring unit on the basis of display information including at least position information of the display units forming the screen unit and a video signal of the display image displayed on the screen unit, adjusts the display image, and reflects a result of the adjustment on the screen unit. Therefore, it is possible to readily adjust the display image while visually checking the display image.

Also, the display control apparatus according to the present invention controls a schedule of the selecting operation of the video signal selecting unit and the video processing operation of the video processing unit by means of the control and monitoring unit. Therefore, it is possible to readily make video adjustment of different video signals.

In addition, the control and monitoring unit of the display control apparatus according to the present invention is connected to an information terminal via the network. Therefore, it is possible to remotely adjust the display image displayed on the screen unit. It is also possible to instantly obtain information on a state of operation of the entire system and the video signal and the like, and thereby collectively control the information of the system.

Moreover, the display control apparatus according to the present invention controls the video signal selecting unit and the video processing unit by means of the control and monitoring unit. Thus, the reduction of the operating units required by the conventional apparatus results in space savings.

As described above in detail, the display control method according to the present invention spuriously displays a display image by means of the control and monitoring unit on the basis of display information including at least position information of the display units forming the screen unit and a video signal of the display image displayed on the screen unit, adjusts the display image, and reflects a result of the adjustment on the screen unit. Therefore, it is possible to readily adjust the display image while visually checking the display image.

Also, the display control method according to the present invention controls a schedule of the selecting operation of the video signal selecting unit and the video processing operation of the video processing unit by means of the control and monitoring unit. Therefore, it is possible to readily make video adjustment of different video signals.

In addition, the control and monitoring unit of the display control method according to the present invention is connected to an information terminal via the network. Therefore, it is possible to remotely adjust the display image displayed on the screen unit. It is also possible to instantly obtain information on a state of operation of the entire system and the video signal and the like, and thereby collectively control the information of the system.

Moreover, the display control method according to the present invention controls the video signal selecting unit and the video processing unit by means of the control and monitoring unit. Thus, the reduction of the operating units required by the conventional apparatus results in space savings.

What is claimed is:

1. A display control system comprising:
    screen means for forming a screen by a plurality of display units each displaying a part of an image;
    video signal processing means for generating a post-video processed signal to be displayed by said plurality of display units from an input video signal, and then supplying the post-video processed signal to said screen means;
    display means for schematically displaying said screen means as a display area based on display information including position information of the plurality of display units forming said screen means and for displaying a state of the display information of said video signal with respect to said display area as an image area;
    control means for controlling the state of display of said image area, wherein
    based on a result of the control, said control means generates control information for controlling a state of display of the image displayed on said screen means, and then said video signal processing means generates the post-video processed signal based on said control information and supplies the post-video processed signal to said screen means; and
    pseudo image display means for spuriously displaying a display image reflecting a result of the control of said control means, wherein
    said pseudo image display means includes property display means for displaying properties of the display image displayed on said screen means, and
    said property display means selectively displays the properties of a type of the video signal, including a video specification and a broadcast system.

2. The display control system as claimed in claim 1, wherein said control means controls a position of the display area of a display image displayed on said display means with respect to said display area.

3. The display control system as claimed in claim 2, wherein said control means controls the position of the display area of the display image displayed on said display means by a pointing device.

4. The display control system as claimed in claim 2, further comprising an input unit for inputting a value of movement in a horizontal direction and a value of movement in a vertical direction of the display area of the display image displayed on said display means, whereby a position of the image displayed on said screen means is controlled based on the values of movement inputted to the input unit.

5. The display control system as claimed in claim 1, wherein said control means controls a size of the display area of a display image displayed on said display means.

6. The display control system as claimed in claim 5, wherein said control means controls the size of the display area of the display image displayed on said display means by a pointing device.

7. The display control system as claimed in claim 5, wherein said input unit comprises a first input unit and further comprising a second input unit for inputting a value of size in a horizontal direction and a value of size in a vertical direction of the display area of the display image displayed on said display means, wherein a size of the image displayed on said screen means is controlled based on the values of size inputted by the second input unit.

8. The display control system as claimed in claim 1, further comprising schedule control means for controlling a schedule of said video signal to be displayed on said screen means, wherein said schedule control means controls the schedule based on at least said video signal and information for controlling said video signal.

9. A display control apparatus for supplying screen means for forming screen by a plurality of display units each displaying a part of an image with a post-video processed signal to be displayed by said plurality of display units, whereas the processed signal is generated from an input video signal, and thereby controlling a display image of said screen means, said display control apparatus comprising:

display means for schematically displaying said screen means as a display area based on display information including position information of the plurality of display units forming said screen means and for displaying a state of display of said video signal with respect to said display area as an image area; and control means for controlling the state of display of said image area, wherein based on a result of the control, said control means generates control information for controlling the state of display of the image displayed on said screen means, then generates the post-video processed signal based on said control information, and supplies the post-video processed signal to said screen means; and pseudo image display means for spuriously displaying a display image reflecting a result of the control of said control means, wherein said pseudo image display means includes property display means for displaying properties of the display image displayed on said screen means, and said property display means selectively displays the properties of a type of the video signal, including a video specification and a broadcast system.

10. The display control apparatus as claimed in claim 9, wherein said control means controls a position of the display area of a display image displayed on said display means.

11. The display control apparatus as claimed in claim 10, wherein said control means controls the position of the display area of the display image displayed on said display means by a pointing device.

12. The display control apparatus as claimed in claim 10, further comprising an input unit for inputting a value of movement in a horizontal direction and a value of movement in a vertical direction of the display area of the display image displayed on said display means, whereby a position of the image displayed on said screen means is controlled based on the values of movement inputted by the input unit.

13. The display control apparatus as claimed in claim 9, wherein said control means controls size of the display area of the display image displayed on said display means.

14. The display control apparatus as claimed in claim 13, wherein said control means controls the size of the display area of the display image displayed on said display means by a pointing device.

15. The display control apparatus as claimed in claim 13, wherein said input unit comprises a first input unit and further comprising a second input unit for inputting a value of size in a horizontal direction and a value of size in a vertical direction of the display area of the display image displayed on said display means, wherein a size of the image displayed on said screen means is controlled based on the values of size inputted by the second input unit.

16. The display control apparatus as claimed in claim 9, further comprising schedule control means for controlling a schedule of said video signal to be displayed on said screen means, wherein said schedule control means controls the schedule based on at least said video signal and information for controlling said video signal.

17. The display control system according to claim 1, wherein said properties include a horizontal frequency, a vertical frequency, and a brightness.

18. The display control apparatus according to claim 9, wherein said properties include a horizontal frequency, a vertical frequency, and a brightness.

* * * * *